United States Patent
Wheeler

(10) Patent No.: US 10,280,003 B2
(45) Date of Patent: May 7, 2019

(54) RAIL CONVEYOR SYSTEM WITH VERTICAL CARRIAGE RETURN

(71) Applicant: Newcastle Innovation Limited, Callaghan (AU)

(72) Inventor: Craig Anthony Wheeler, Callaghan (AU)

(73) Assignee: NEWCASTLE INNOVATION LIMITED, Callaghan (AU)

( * ) Notice: Subject to any disclaimer, the term of this patent is extended or adjusted under 35 U.S.C. 154(b) by 0 days.

(21) Appl. No.: 15/523,056

(22) PCT Filed: Oct. 29, 2015

(86) PCT No.: PCT/AU2015/000655
§ 371 (c)(1),
(2) Date: Apr. 28, 2017

(87) PCT Pub. No.: WO2016/065406
PCT Pub. Date: May 6, 2016

(65) Prior Publication Data
US 2017/0313519 A1  Nov. 2, 2017

(30) Foreign Application Priority Data
Oct. 30, 2014 (AU) .................. 2014904358

(51) Int. Cl.
*B65G 15/08* (2006.01)
*B65G 17/02* (2006.01)
(Continued)

(52) U.S. Cl.
CPC .............. *B65G 17/02* (2013.01); *B65G 15/08* (2013.01); *B65G 21/22* (2013.01); *E21F 13/02* (2013.01)

(58) Field of Classification Search
CPC ......... B65G 17/02; B65G 21/22; B65G 39/20
(Continued)

(56) References Cited

U.S. PATENT DOCUMENTS 2,582,881 A * 1/1952 Mitchell ................ B65G 15/60
198/823
2,763,361 A   9/1956 Foster
(Continued)

FOREIGN PATENT DOCUMENTS

DE   284 855 A5   10/1983
DE   3426106 A    1/1986
(Continued)

OTHER PUBLICATIONS

International Search Report dated Dec. 1, 2015 for International Patent Application PCT/AU2015/000655.
(Continued)

*Primary Examiner* — William R Harp
(74) *Attorney, Agent, or Firm* — Morgan, Lewis & Bockius LLP

(57) ABSTRACT

The present invention provides a rail conveyor system of the type having a rail track (9) including a delivery run (1) extending between a loading end (5) and a discharge end (6) and a return run (12) extending from the discharge end (6) to the loading end (5), a plurality of carriages (8) spaced apart from one another and arranged to run on wheels (24) supported by the track (9), and a continuous carry belt (10) supported by the carriages (8); wherein, at least at the discharge end (6), the carriages (8) are turned around to return to the loading end (5) by being entrained around only one or more vertical turnover wheels (7) arranged such that the carriages (7) are delivered to the return run (12) beneath the delivery run (1).

22 Claims, 30 Drawing Sheets

(51) Int. Cl.
*B65G 21/22* (2006.01)
*E21F 13/02* (2006.01)

(58) Field of Classification Search
USPC .................................. 198/823, 837, 838, 779
See application file for complete search history.

(56) References Cited

U.S. PATENT DOCUMENTS

| | | | | |
|---|---|---|---|---|
| 2,821,290 A | * | 1/1958 | Duncan | B65G 17/02 |
| | | | | 198/823 |
| 2,979,187 A | | 4/1961 | Erickson | |
| 4,351,431 A | | 9/1982 | Fenton, Jr. et al. | |
| 4,696,390 A | * | 9/1987 | Curtis | B65G 15/60 |
| | | | | 198/823 |
| 8,887,900 B2 | * | 11/2014 | Wheeler | B61D 11/02 |
| | | | | 104/173.1 |
| 2013/0118371 A1 | * | 5/2013 | Wheeler | B61D 11/02 |
| | | | | 104/118 |

FOREIGN PATENT DOCUMENTS

| | | |
|---|---|---|
| DE | 3504995 C1 | 8/1986 |
| GB | 696969 A | 9/1953 |
| GB | 711974 A | 7/1954 |
| GB | 737583 A | 9/1955 |
| JP | S-56 122708 A | 9/1981 |
| WO | 2012/009765 A1 | 1/2012 |

OTHER PUBLICATIONS

Written Opinion of the International Searching Authority dated Dec. 1, 2015 for International Patent Application PCT/AU2015/000655.
International Preliminary Report on Patentability dated Feb. 25, 2016 for International Patent Application PCT/AU2015/000655.

* cited by examiner

RAIL CONVEYOR SYSTEM WITH VERTICAL CARRIAGE RETURN

CROSS-REFERENCE TO RELATED APPLICATIONS

This application is a U.S. National Stage of International Patent Application No. PCT/AU2015/000655, filed Oct. 29, 2015, which claims the benefit of Australian Patent Application No. AU2014904358, filed Oct. 30, 2014, each of which is incorporated by reference herein in its entirety.

FIELD OF THE INVENTION

This invention relates to a Rail Conveyor System with Vertical Carriage Return and has been devised particularly though not solely for use in situations requiring a narrow footprint at the head and/or tail end of the system.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

There are many advantages to rail conveyor technology for the long distance transportation of bulk materials as is set out in our International patent application PCT/AU2011/000930 published as WO2012/009765A1, the content of which is incorporated herein by way of cross-reference.

In the rail conveyor system as described in our earlier PCT application, the carriages are typically turned around at both the head and tail end of the system on a horizontal rail loop as shown in FIG. 1 of the present application. This has the advantage of being simple and direct, and is suitable for situations where there is adequate room to accommodate the width of the rail loops.

There are however many situations where space is limited at either or both of the head and tail end of the conveyor system and where it is necessary to redirect the carriages from the delivery run to the return run using only a narrow footprint.

Even the turnaround configuration shown in FIG. 4 of PCT/AU2011/000930 has a significant width of approximately 5-6 meters due to the necessity to position the delivery run and the return run side by side and to re-orientate the carriages using a horizontal turnaround wheel. This wide footprint is not suitable in many delivery situations.

SUMMARY OF THE INVENTION

The present invention therefore provides a rail conveyor system of the type having a rail track including a delivery run extending between a loading end and a discharge end and a return run extending from the discharge end to the loading end, a plurality of carriages spaced apart from one another and arranged to run on wheels supported by the track, and a continuous carry belt supported by the carriages;

wherein, at least at the discharge end, the carriages are turned around to return to the loading end by being entrained around only one or more vertical turnover wheels arranged such that the carriages are delivered to the return run beneath the delivery run.

Preferably, there is a single vertical turnover wheel, with the delivery run, the turnover wheel, and the return run being located in the same vertical plane at the discharge end.

Preferably, at the loading end, the carriages are turned around to return to the discharge end by being entrained around only one or more vertical turnover wheels arranged such that the carriages are delivered to the delivery run above the return run. More preferably, there is a single vertical turnover wheel, with the delivery run, the turnover wheel, and the return run being located in the same vertical plane at the loading end.

In one form of the invention the carriages in the return run are rotated through 180° about an axis in or parallel to the return run after leaving the turnover wheel, such that the carriages are returned in an upright orientation.

Preferably, the carriages are designed to accommodate flexing while being rotated.

In one form the flexibility is achieved by providing compressible blocks as mountings between supports for the wheels and supports for the carry belt.

In another form the flexibility is achieved by mounting the wheels on leaf springs attached to the carriage.

In a further form of the invention the carriages are designed to travel the return run in an inverted position and are provided with means to support the carry belt in the inverted position.

In one embodiment the means to support the carry belt in the inverted position include pads protruding upwardly from the carriage when in the inverted position.

In an alternative embodiment, the means to support the carry belt in the inverted position include bars arranged to support the carry belt in a load carrying manner such that bulk material can be conveyed on both the delivery run and the return run.

Preferably, the carriages are interconnected and spaced apart by a rope and wherein the rope is tensioned by horizontal movement of the turnover wheel.

Preferably, the rope passes through a hole in a bush in each carriage and the rope is provided with a stop, larger in width than the hole in the bush, adjacent each carriage such that each carriage can move relative to the rope, up to and away from the stop, to accommodate relative differences in stretch between the carry belt and the rope.

Preferably, a compression spring is provided for each carriage, wound around the rope and arranged to act as a buffer between the bush and the stop.

Alternatively, the carriages are preferably fixed to the rope by means of a mechanical fastener. In one form, the mechanical fastener is a quick action fastener designed for quick release of the carriages from the rope. This enables reduce time required for maintenance of the carriages and/or rope.

Preferably, the rope is a wire rope. Alternatively, the rope is made of nylon or polyester.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Notwithstanding any other forms that may fall within its scope, one preferred form of the invention, and variations thereof, will now be described with reference to the accompanying drawings in which:

FIG. 19 is a perspective view of the drive end arrangement using a tensioning system of the type shown in FIG. 18;

DETAILED DESCRIPTION OF PREFERRED EMBODIMENTS

Figure 1:
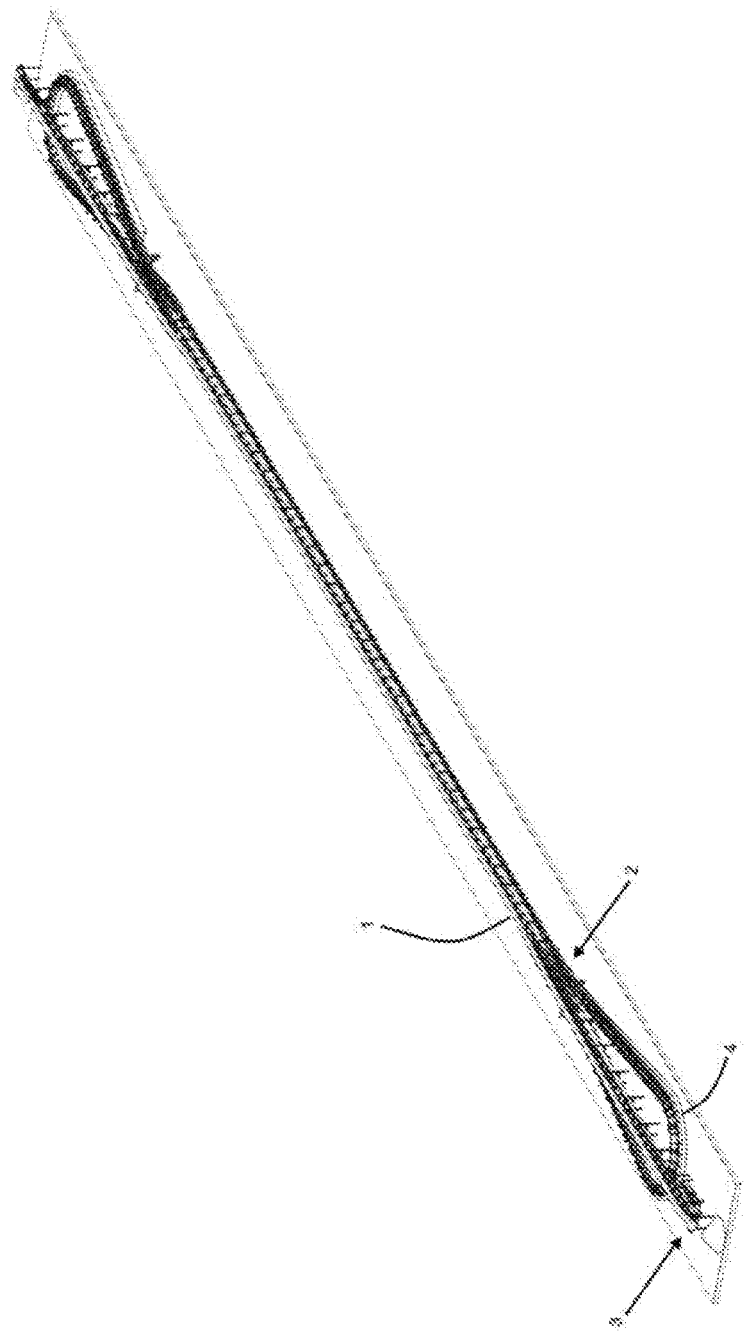
FIG. 1 is a perspective view of a prior art rail conveyor system utilising horizontal turnaround loops at each end.

In a long distance rail conveyor system of the type shown in FIG. 1, the delivery run 1 is typically separated from the support carriages at approximately position 2 so that bulk material conveyed on the delivery run of the carry belt may be discharged at point 3 while the carriages on their rail tracks are sent around a return loop 4 before being reunited with the carry belt in the return run at location 2. While this is suitable for situations typically over long distances, it requires a wide horizontal footprint for the return loop 4 which is not always available.

While the rail conveyor technology is ideally suited to long distance transportation due to improved energy efficiency, the technology also has significant advantages when compared to conventional belt conveying systems for shorter conveying distances. Notably, the rail conveyor technology has the advantage of being able to negotiate smaller radius horizontal curves and where necessary convey bulk material in both directions.

Figure 2:
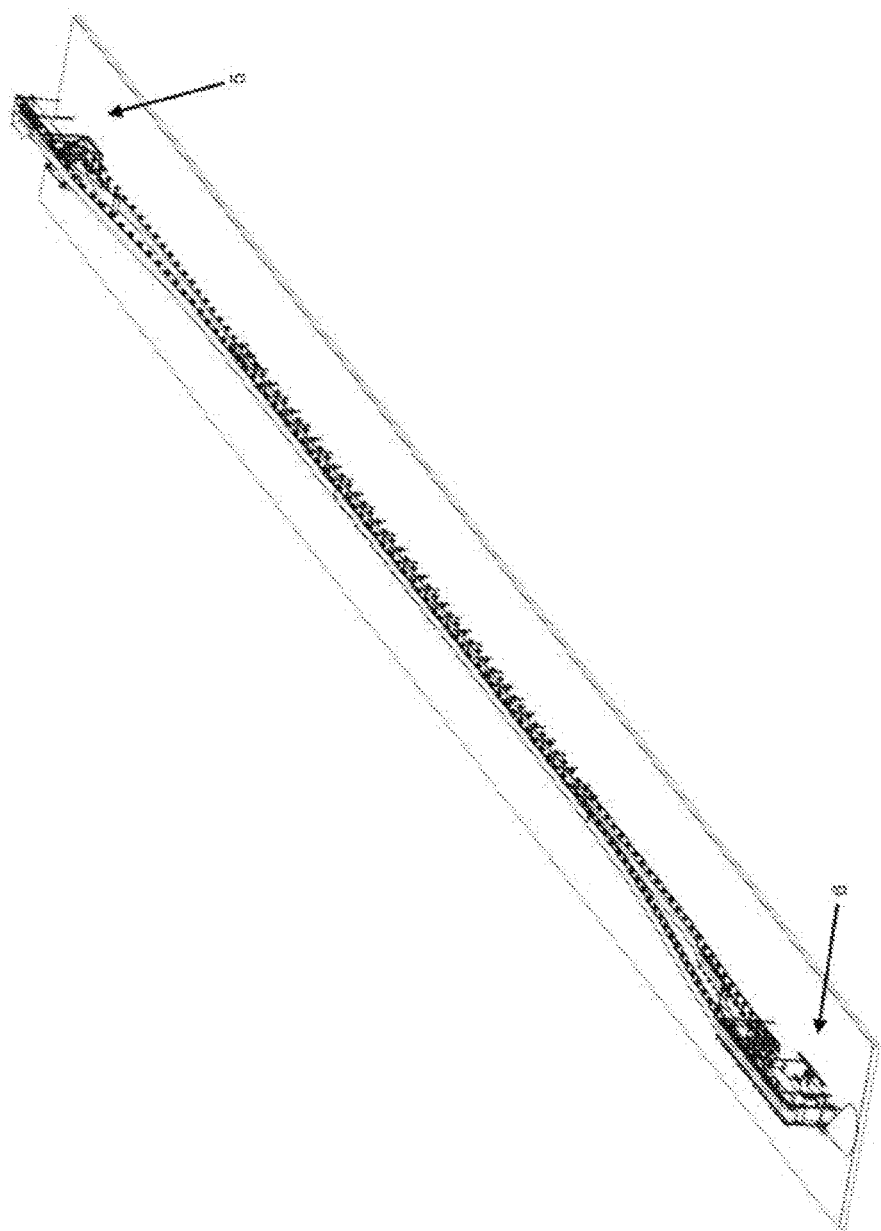
FIG. 2 is a similar view to FIG. 1 showing the vertical carriage return system according to the invention at either end of the conveyor.

To facilitate shorter conveying operations, it is frequently necessary to reduce the width of the footprint at the head and/or tail end of the system as shown in FIG. 2 at 5 and 6. This results in a vastly more compact rail conveyor, at least at the delivery end 6 compared with the prior art loop return system shown in FIG. 1.

Figure 3:
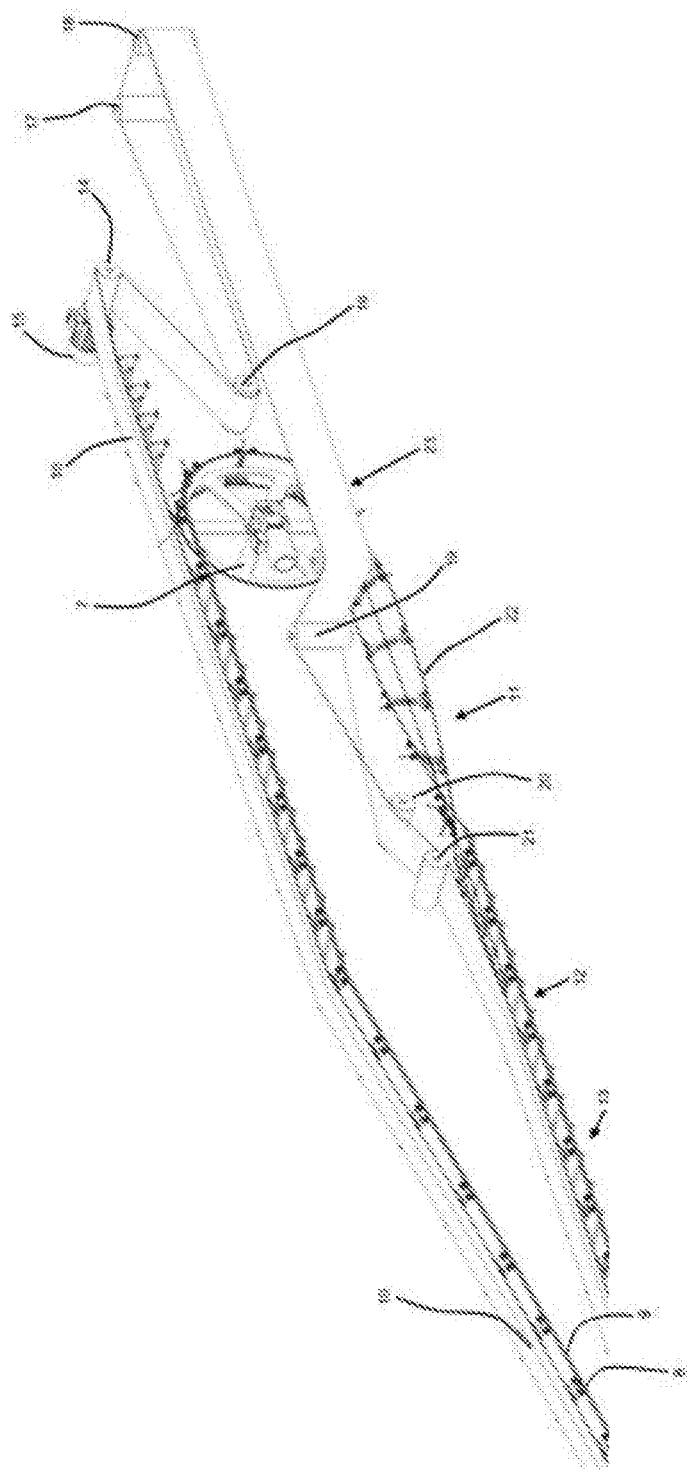
FIG. 3 is a perspective view to an enlarged scale of the delivery end of the conveyor shown in FIG. 2 wherein the carriages are returned to an upright position after passing over the turnaround wheel.

To do this, a vertical turnover wheel 7 (FIG. 3) is required to redirect the carriages at each end. The vertical wheel will be pre-tensioned at one end (as will be described further below) to accommodate the extension of the connecting wire rope cable between carriages while driving.

In a first embodiment of the invention as will now be described with reference to FIGS. 3 to 7 the carriages 8 supporting the carry belt 10 on rails 9 are rotated through 180° in a helix 11 about an axis in, or parallel to, the return run 12 after leaving the turnover wheel 7, such that the carriages are returned in an upright orientation as can be seen at 13. The carry belt 10 is lifted from the carriages 8 as it passes over the turnover wheel 7 and extended to a driving pulley 14 powered by a motor 15.

The carry belt may then be returned around a further series of pulleys 16, 17, 18, 19, 20 and 21 before returning to the carriages at position 12.

The carriages are typically guided through the helix at 11 by guide rails or wires 22 which affect the 180° rotation of the carriages from the inverted position at 23 as they leave the turnover wheel 7 to an upright position at 12.

To accommodate the flexing or twisting of each carriage through the helix 11 the carriages are designed to accommodate flexing while being rotated.

The same arrangement is also in place at the loading end 5 so that the carriages 8 are turned around to return to the discharge end 6, although in this case the carriages 8 entrained by the turnover wheel 7 are delivered to the delivery run 1 above the return run 12.

Figure 4:
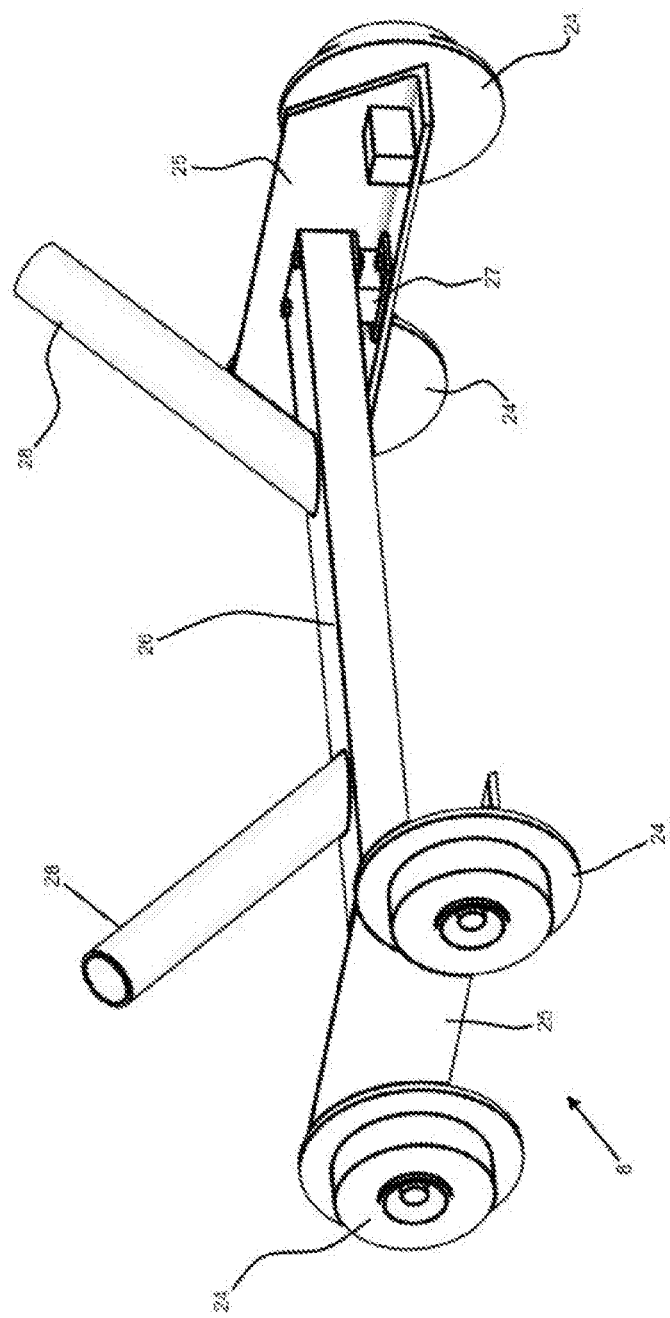
FIG. 4 is a diagrammatic perspective view of a flexible carriage using rubber pads.

In one form as shown in FIG. 4, the wheels 24 of each carriage 8 are mounted on bogey members 25 which are in turn mounted on the chassis cross-rail 26 of the carriage by way of compressible blocks 27. The compressible blocks 27 can be located at one or both ends of the carriage 8.

Figure 5:
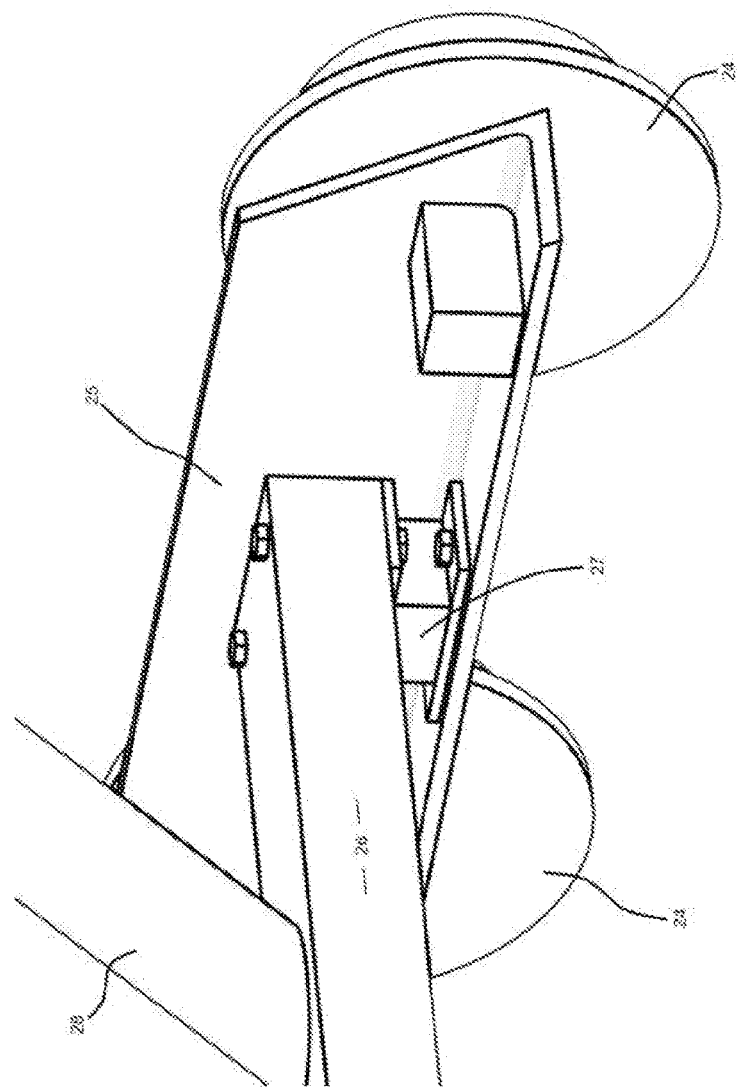
FIG. 5 is an enlarged view of a portion of FIG. 4.

This is shown in more detail in FIG. 5 where the compressible blocks 27 are typically flexible rubber mounting pads.

The carry belt is typically supported on each carriage by inclined arms 28 extending upwardly from the chassis member 26.

Figure 6:
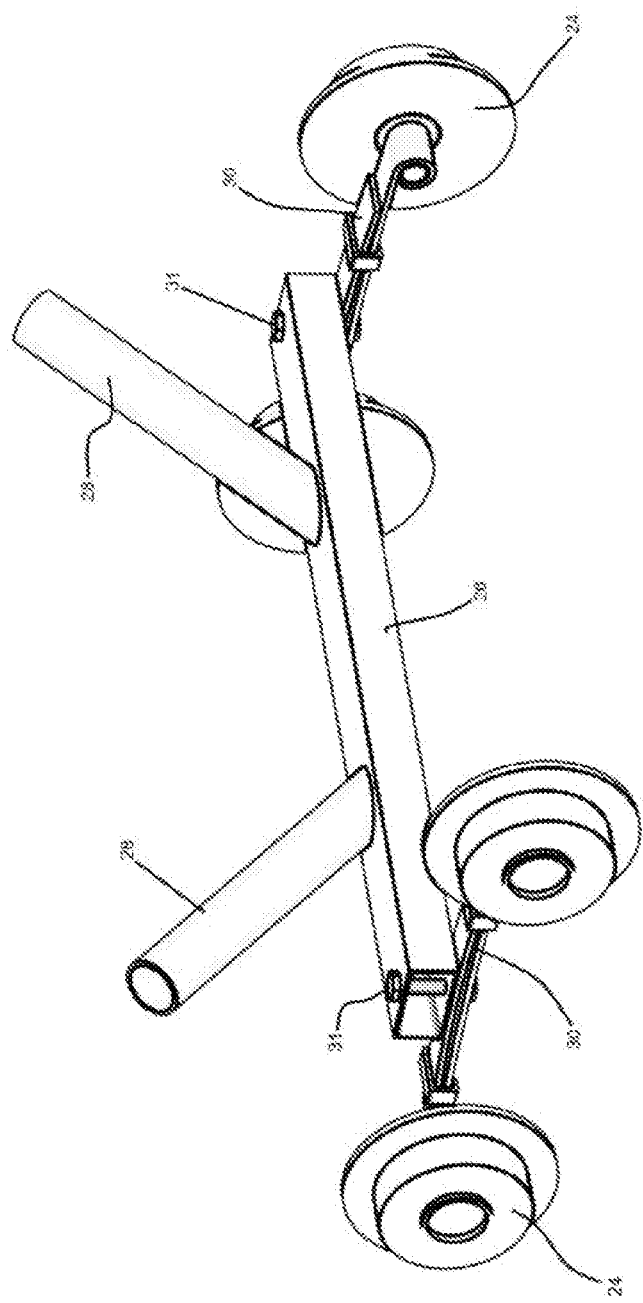
FIG. 6 is a perspective view of an alternative form of flexible carriage using leaf springs.
Figure 7:
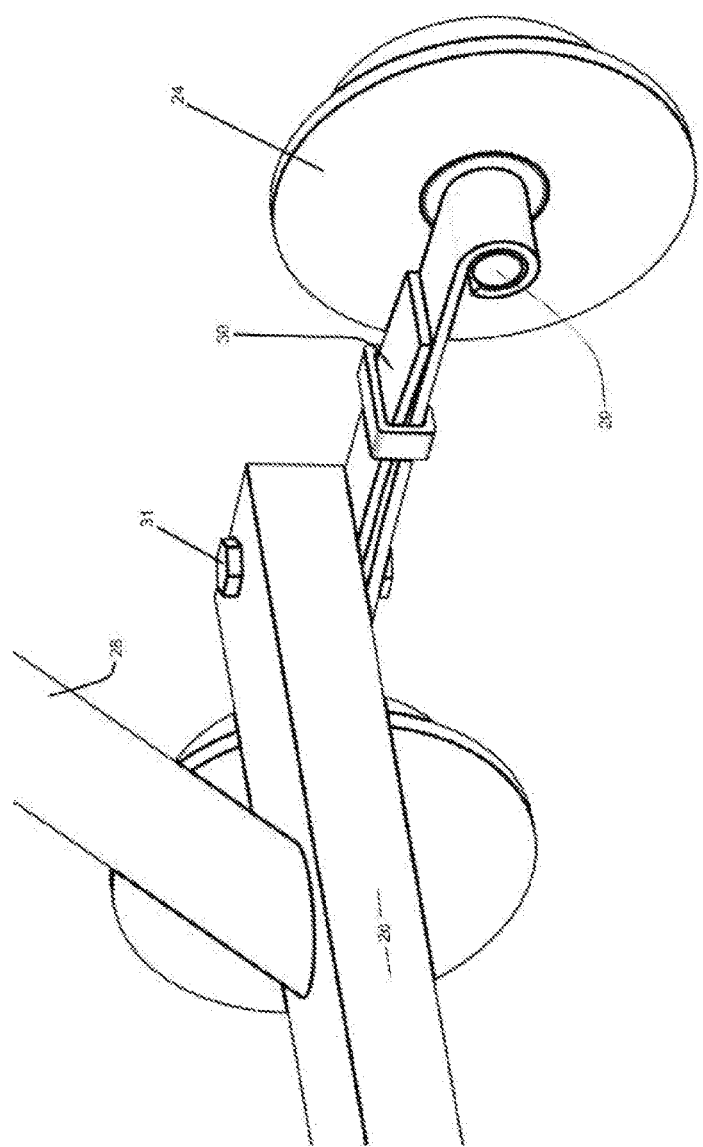
FIG. 7 is an enlarged view of a portion of FIG. 6.

An alternative way of accommodating the flexing while the carriages are being rotated is shown in FIGS. 6 and 7 where the wheels 24 are rotatably mounted on axles 29 supported at the ends of flexible leaf springs 30 which are in turn bolted to the chassis rail 26 at 31. The leaf springs 30 can be located at one or both ends of the carriage 8.

In a further form of the invention as will now be described with reference to FIGS. 8 to 19 the carriages are designed to travel the return run in an inverted position and are provided with means to support the carry belt in the inverted position.

Figure 13:
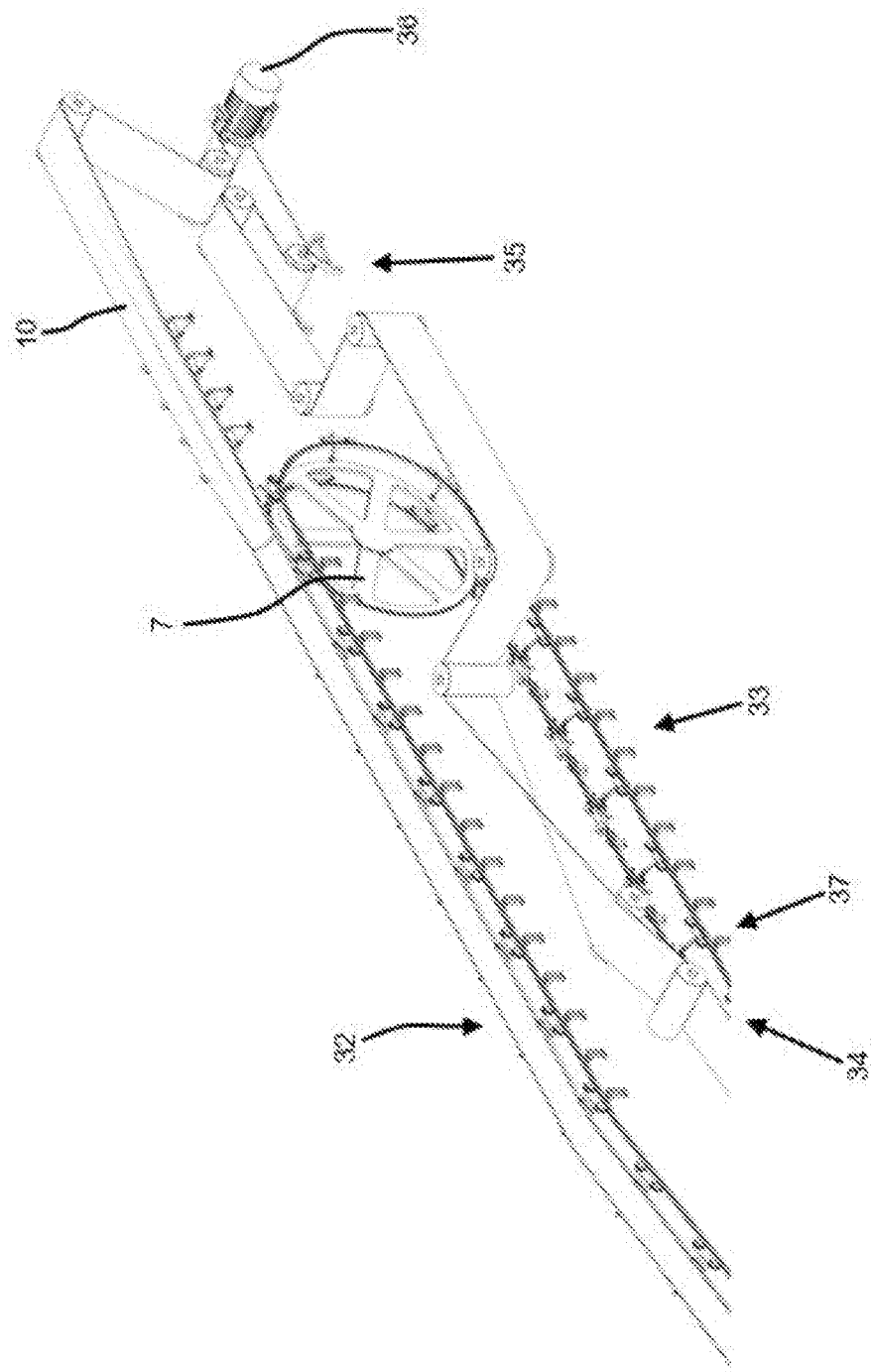
FIG. 13 is a perspective view of the driven discharge end of the embodiment of the invention using inverted carriages in the return run.
Figure 14:
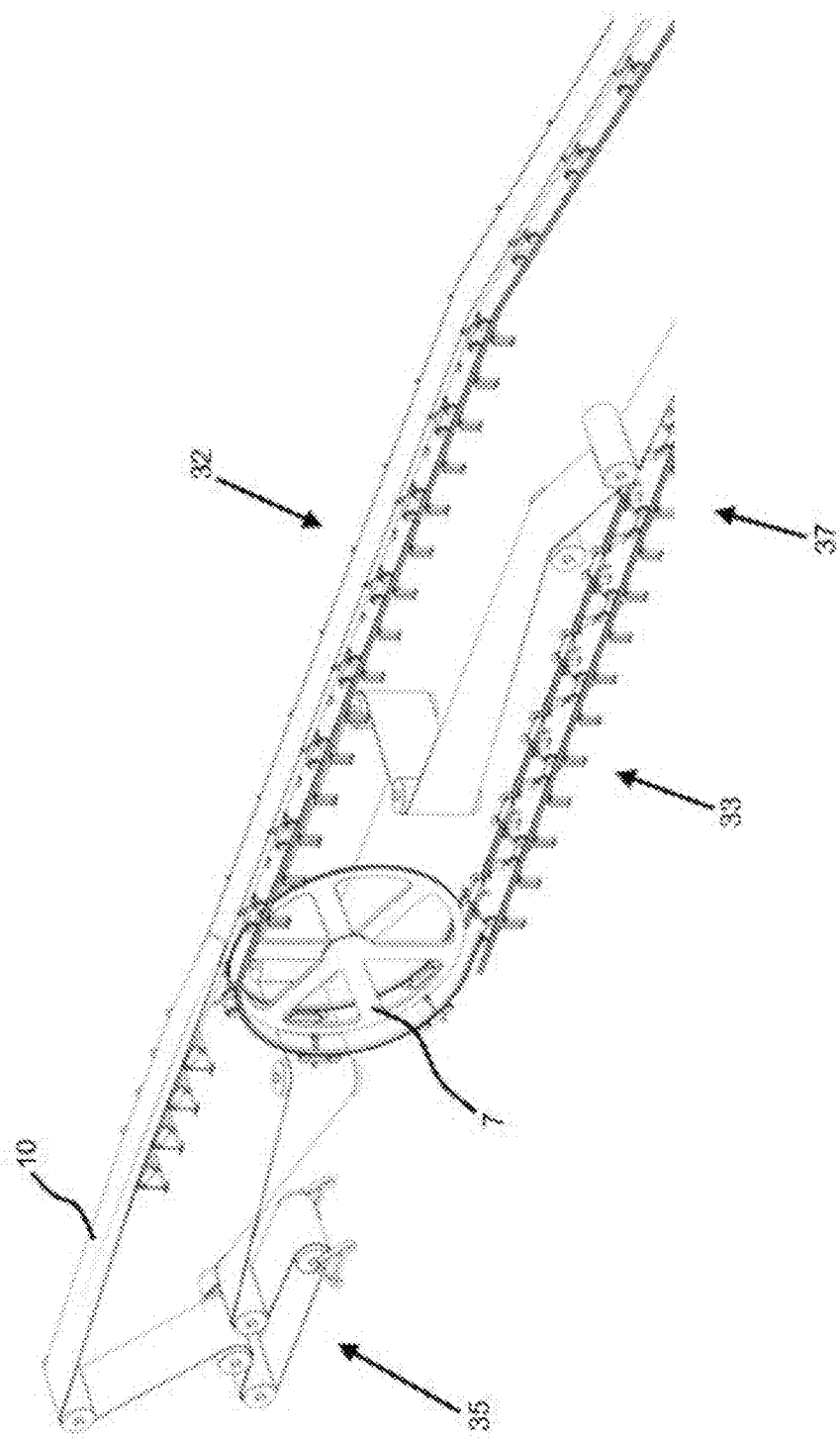
FIG. 14 is a perspective view from the opposite side of FIG. 13.

As can be seen in FIG. 13, the vertical turnover wheel 7 is positioned to turn the carriages from the upright position in the delivery run 32 to an inverted position as shown at 33 in the return run 34. As in the embodiment described above, the carry belt 10 is lifted from the carriages as they pass over the turnover wheel 7 and passes through a series of rollers generally shown at 35, driven by a motor 36 before being returned to the inverted carriages at position 37. This is a simple and effective manner of returning the carriages using a very narrow horizontal footprint as can be clearly seen in FIGS. 13 and 14 showing the turnover wheel arrangement at both the loading and discharge ends 5, 6 and is made possible by providing the carriages with means to support the carry belt in the inverted position as will be described further below.

Figure 8:
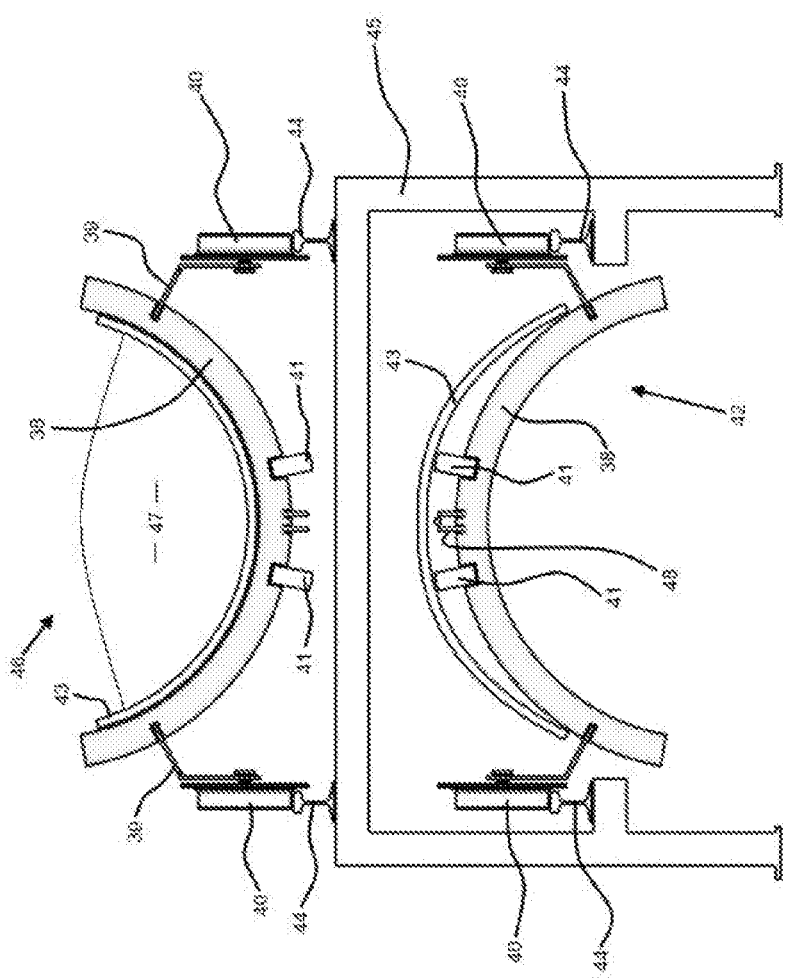
FIG. 8 is a cross-sectional elevation through the delivery run and return run of an alternative embodiment of the invention wherein carriages are returned in an inverted position.
Figure 9:
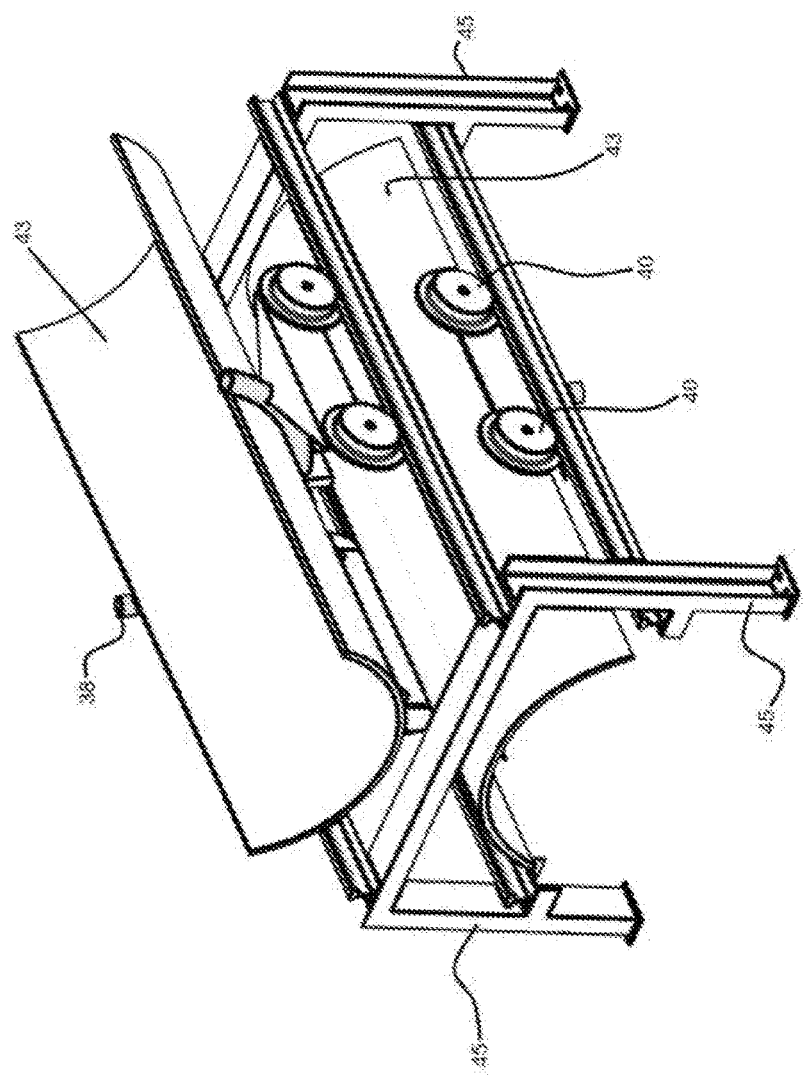
FIG. 9 is a perspective view of the configuration shown in FIG. 8.

The carriage design can be seen most clearly in FIGS. 8 and 9 where the carriages are typically constructed from pipe bent into a semi-circular section 38 to which is welded two end plates 39 with mountings for bearings rotatably securing the flanged carriage wheels 40. This results in a carriage which is light in weight and with a relatively low fabrication cost.

The semi-circular pipe 38 forming the chassis of the carriage is also provided with pads 41 which protrude upwardly from the carriage when in the inverted position 42 to support the carry belt 43 as it drapes in the inverted position over the pads 41 and the chassis tube 38. The pads are typically formed from polyurethane material.

The carriages run on rails 44 supported by frame members 45 placed at intervals along the intended run of the conveyor system and designed as appropriate for the terrain.

In the delivery run as shown at 46, the carry belt 43 is supported in a troughed configuration by the semi-circular chassis tubes 38 to support the bulk material load 47.

The wire rope that interconnects the carriages (as will be described further below) is supported by brackets 48 with the pads 41 providing adequate clearance between the wire rope and the belt along the return side.

Figure 9A:
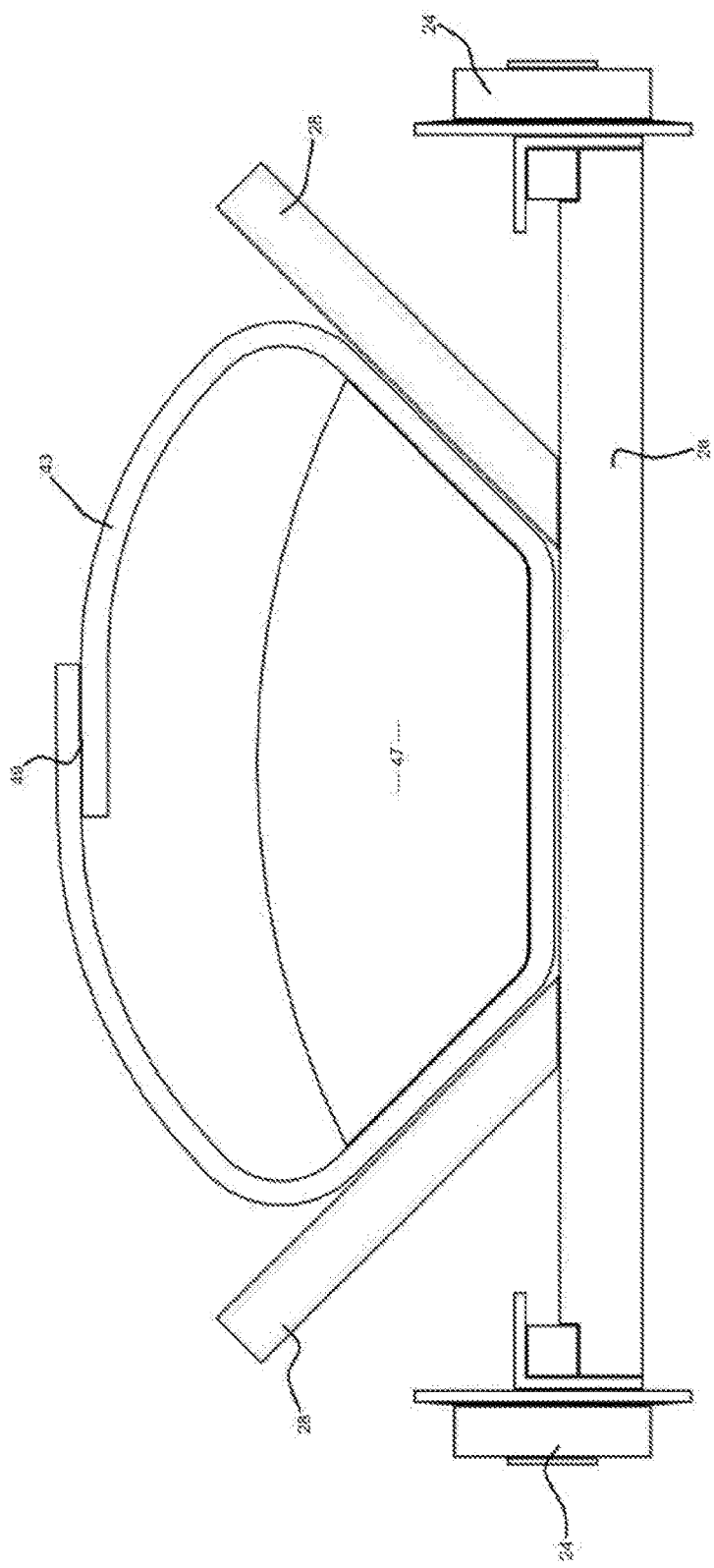
FIG. 9A is a vertical section through a carriage designed to operate with an enclosed belt.

In some situations, it is desirable to fully enclose the load 47 and it is also possible to wrap the carry belt 43 around the load so that it overlaps at position 49 totally enclosing the load 47 as can be seen in FIG. 9A. Auxiliary components, such as pivoting arms, may be added to the carriages 8 to ensure the belt remains in the enclosed position during operation.

Figure 10:
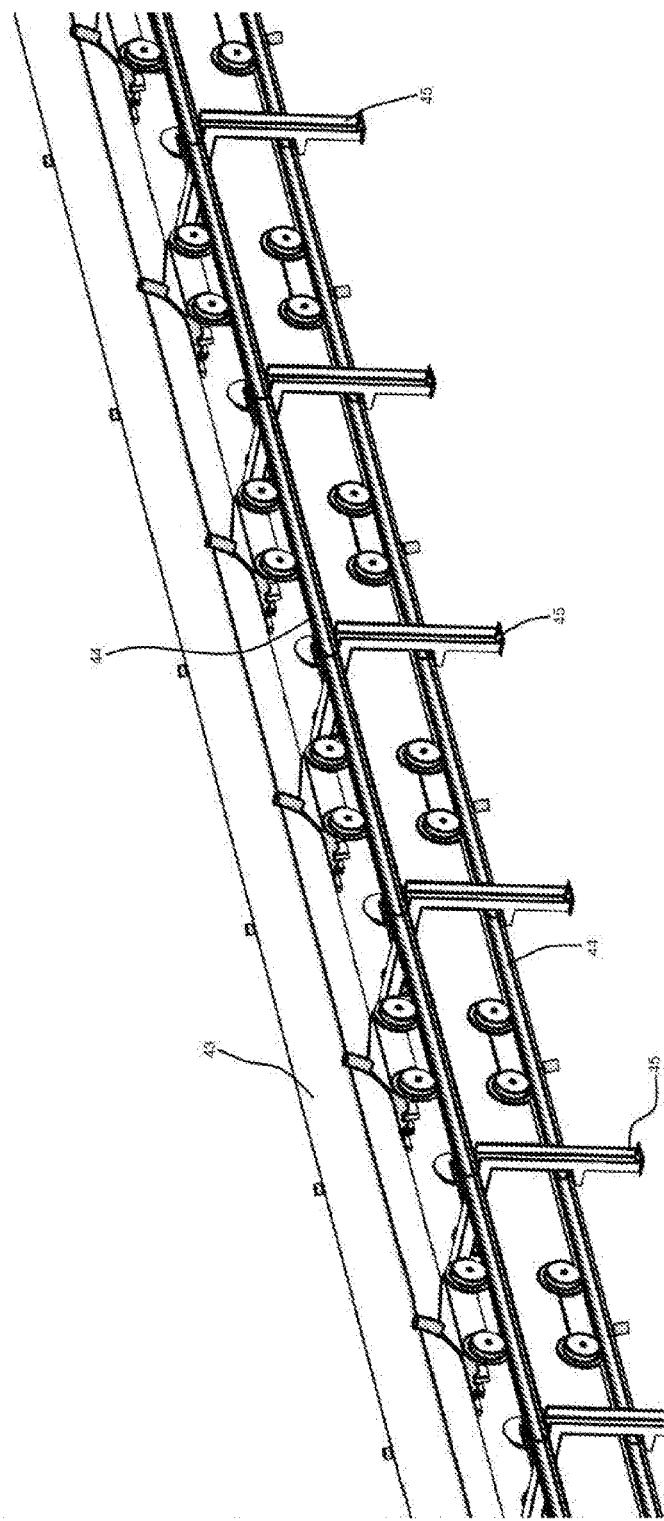
FIG. 10 is an expanded view of the configuration shown in FIG. 9.

A more distant view of the configuration shown in FIG. 9 can be seen in FIG. 10 where it will be apparent that the rails 44 act as a longitudinal support structure for the frames 45 and tie each vertical support frame 45 together. This can also be seen clearly in FIG. 11.

Figure 11:
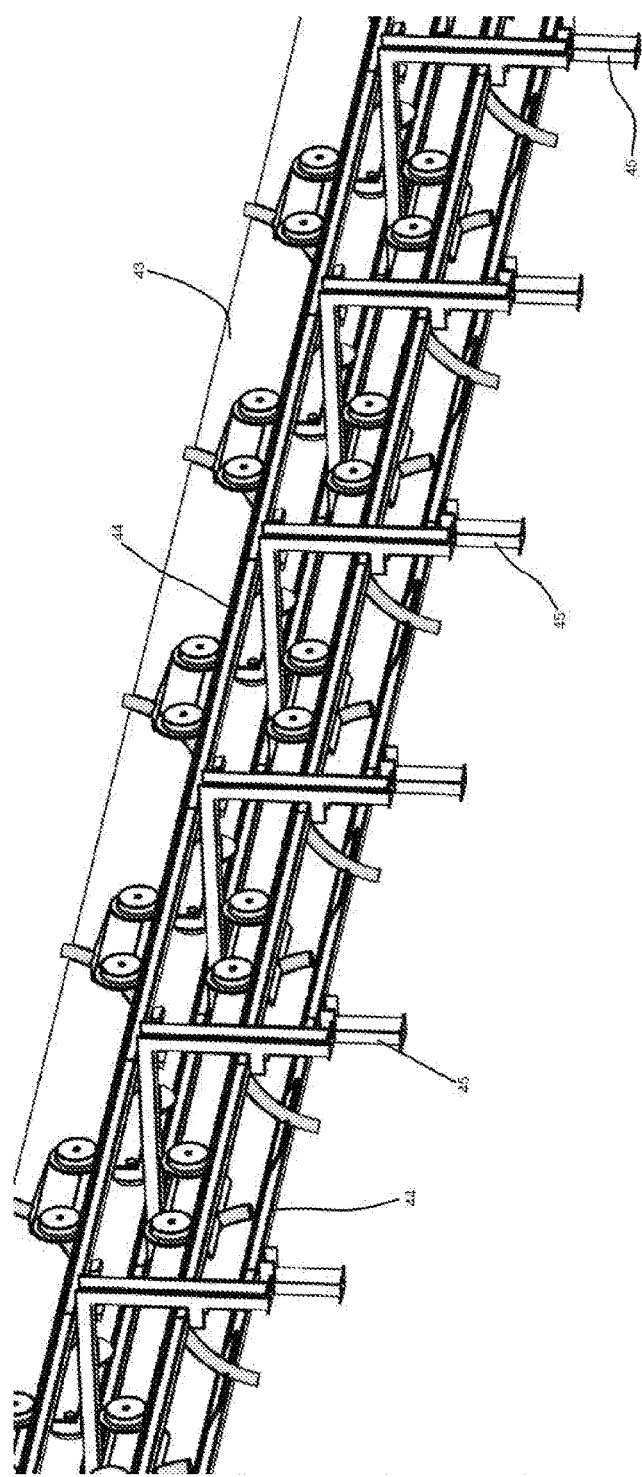
FIG. 11 is an alternative view of FIG. 10 showing the conveyor from beneath.
Figure 12:
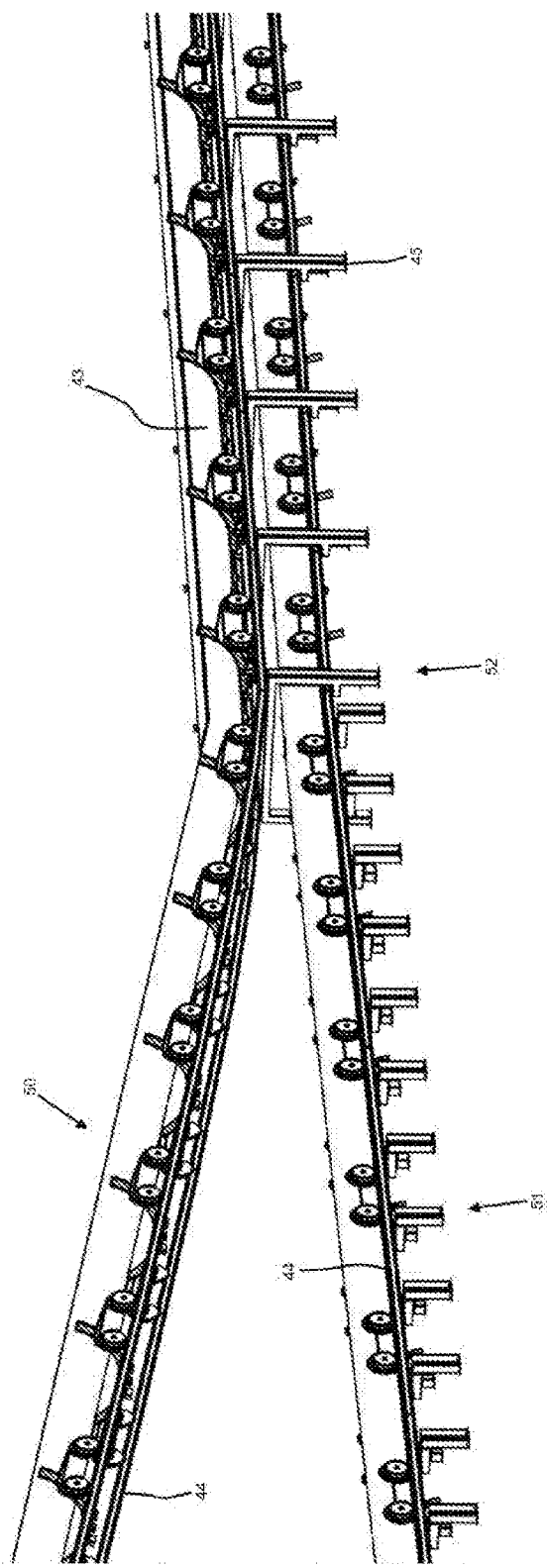
FIG. 12 is a perspective view of the configuration shown in FIGS. 10 and 11 showing separation of the delivery run and the return run at the head and/or tail ends of the conveyor.

FIG. 12 is a perspective view of the configuration shown in FIGS. 10 and 11 showing separation of the delivery run 50 from the return run 51 at separation point 52.

It is also possible to utilise the inverted carriages in the return run for conveying bulk material such that material can be conveyed in both directions where required. This will be described further with reference to FIGS. 15 to 17.

Figure 15:
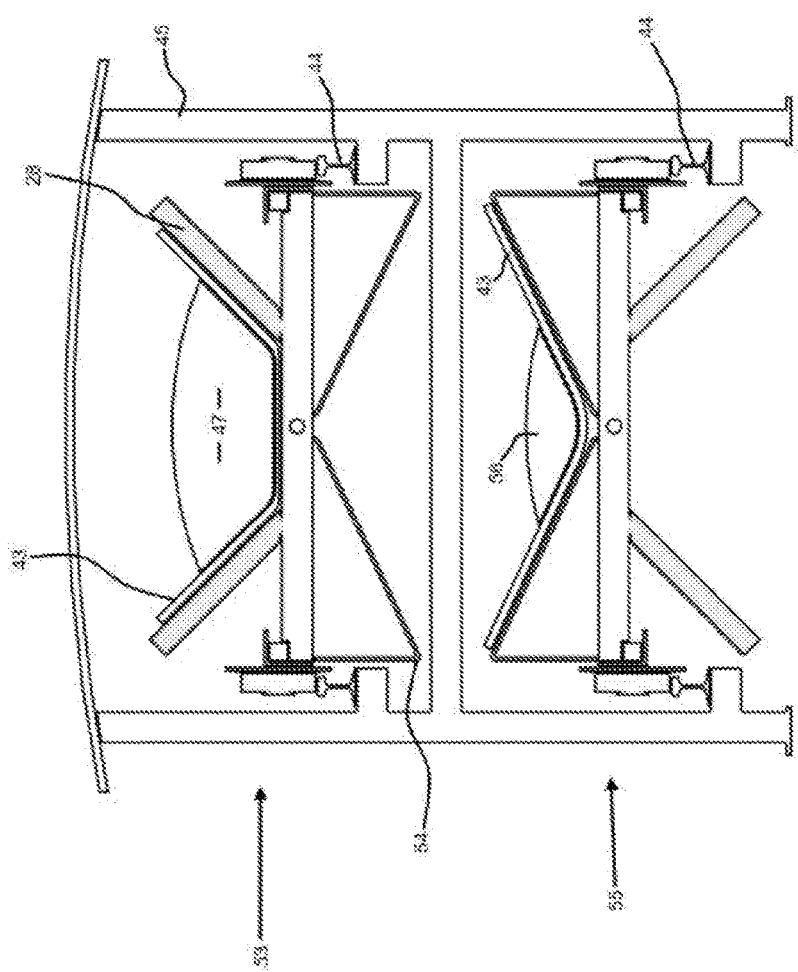
FIG. 15 is a cross-sectional elevation of the delivery run and return run utilising inverted carriages to convey bulk material in the return run.

As can be seen in FIG. 15 as well as the inclined tubes 28 supporting the carry belt 43 in the delivery run 53 to provide support for the bulk material load 47, each carriage can be provided with further support members in the form of bent steel flat bar 54 arranged to support the carry belt 43 in the return run 55 such that a return load 56 can be carried on the return run.

Figure 16:
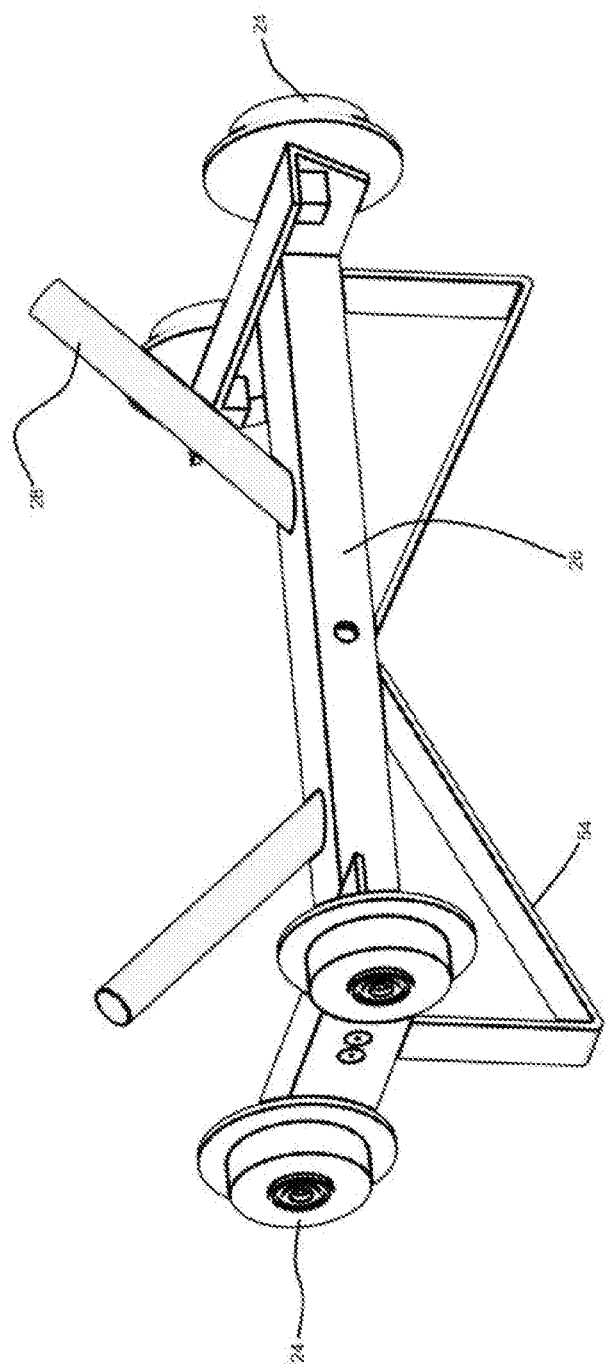
FIG. 16 is an enlarged perspective view of the carriages used in FIG. 15.
Figure 17:
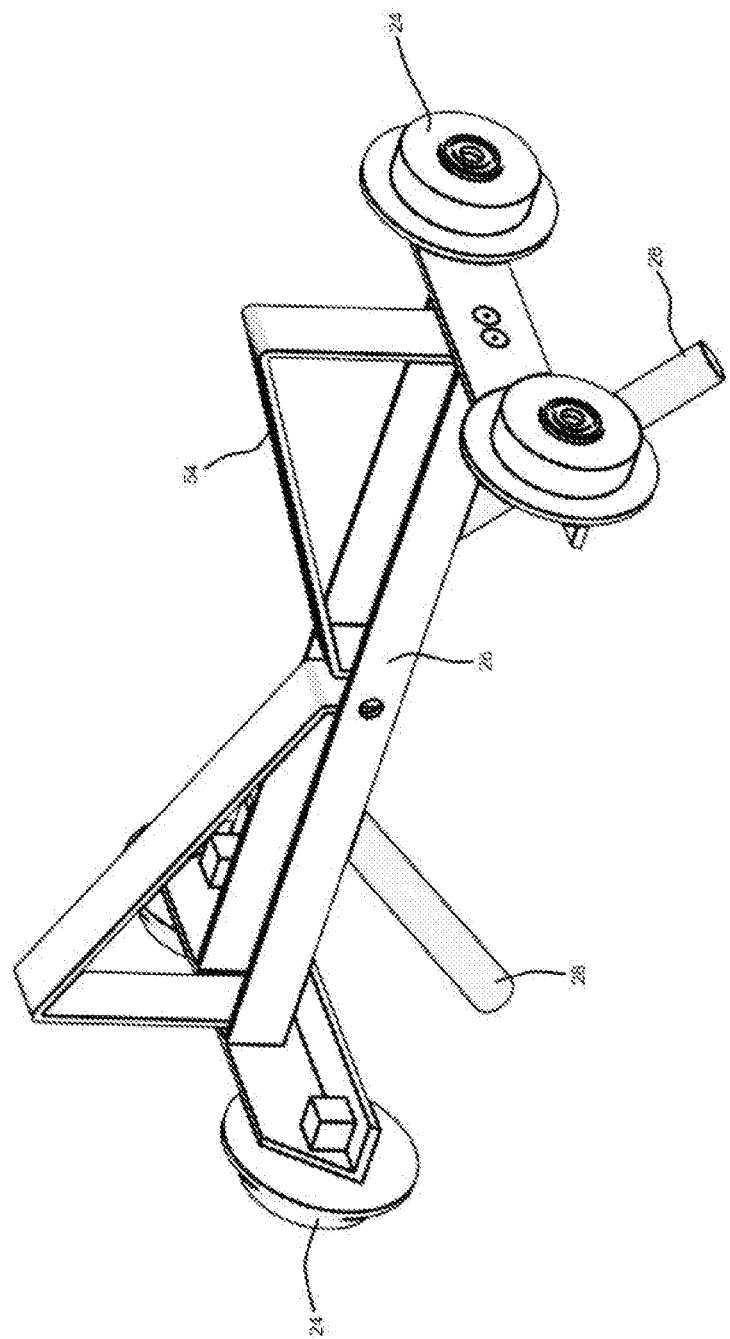
FIG. 17 is a perspective view of the carriage of FIG. 16 in the inverted position.

The configuration of the bars to support the carry belt in the return load can be more clearly seen in FIG. 16 with the carriage oriented for the supply run and in FIG. 17 with the carriage inverted and oriented for the return run. Depending on the requirement to convey in both directions, alternative means to support the conveyor belt along the return side are possible with different configurations of the flat bar 54.

Figure 18:
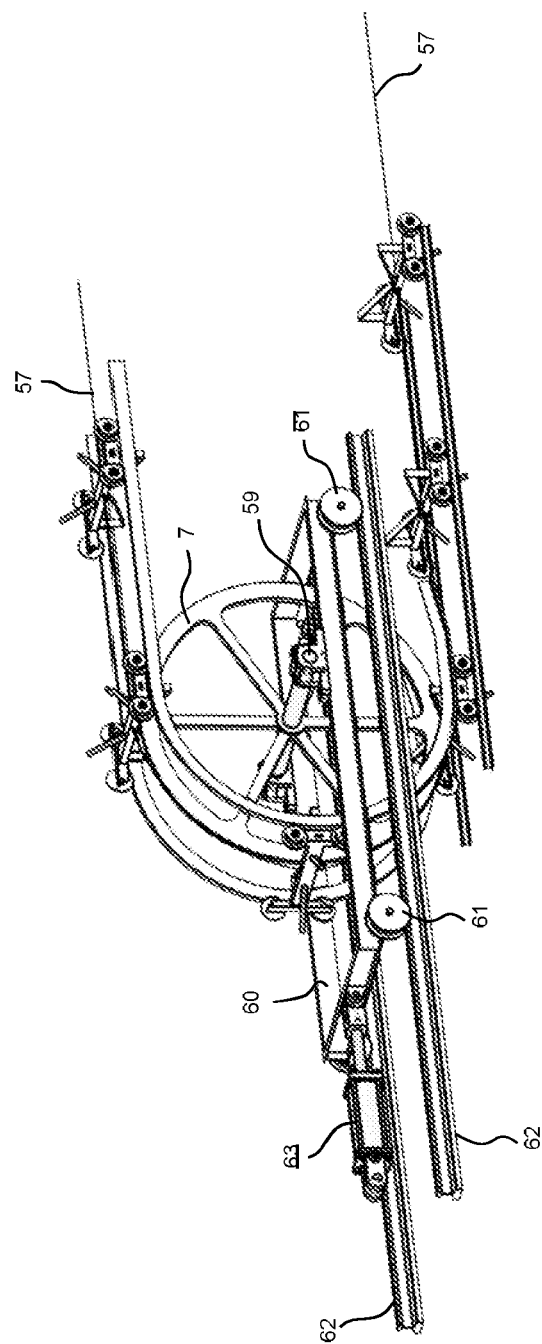
FIG. 18 is a perspective view of the vertical turnover wheel with mechanism for tensioning the wire rope.
Figure 19:
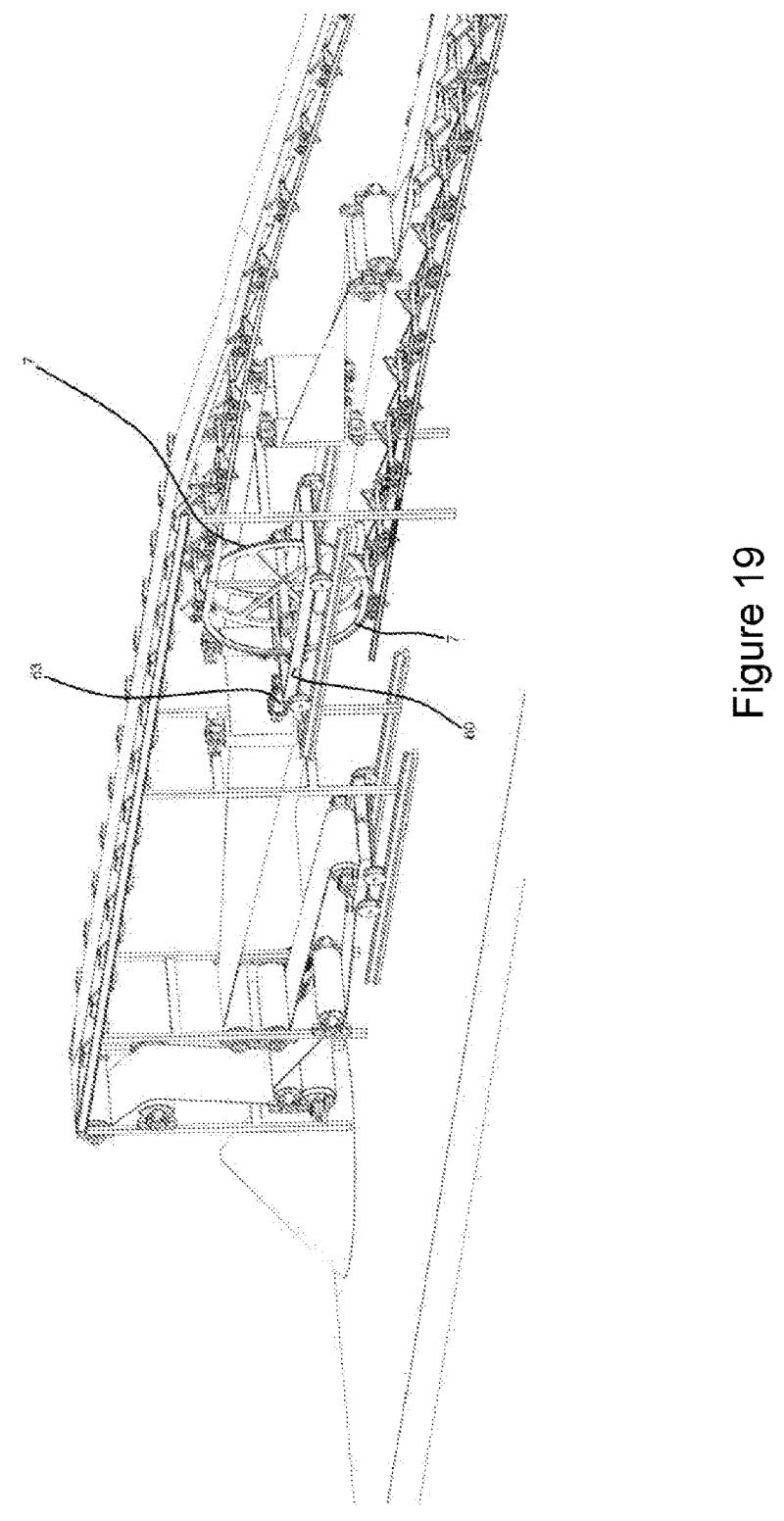
Figure 20:
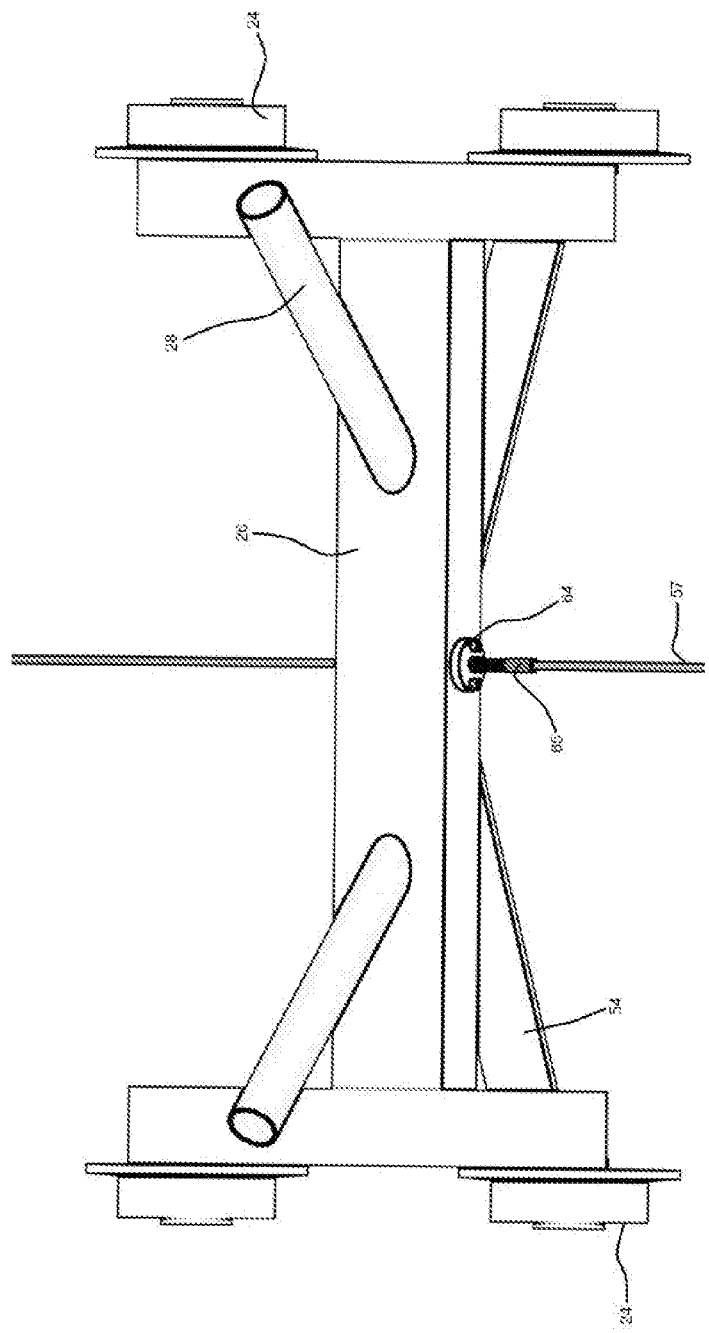
FIG. 20 is a top perspective view of a carriage showing the engagement with the wire rope.
Figure 21:
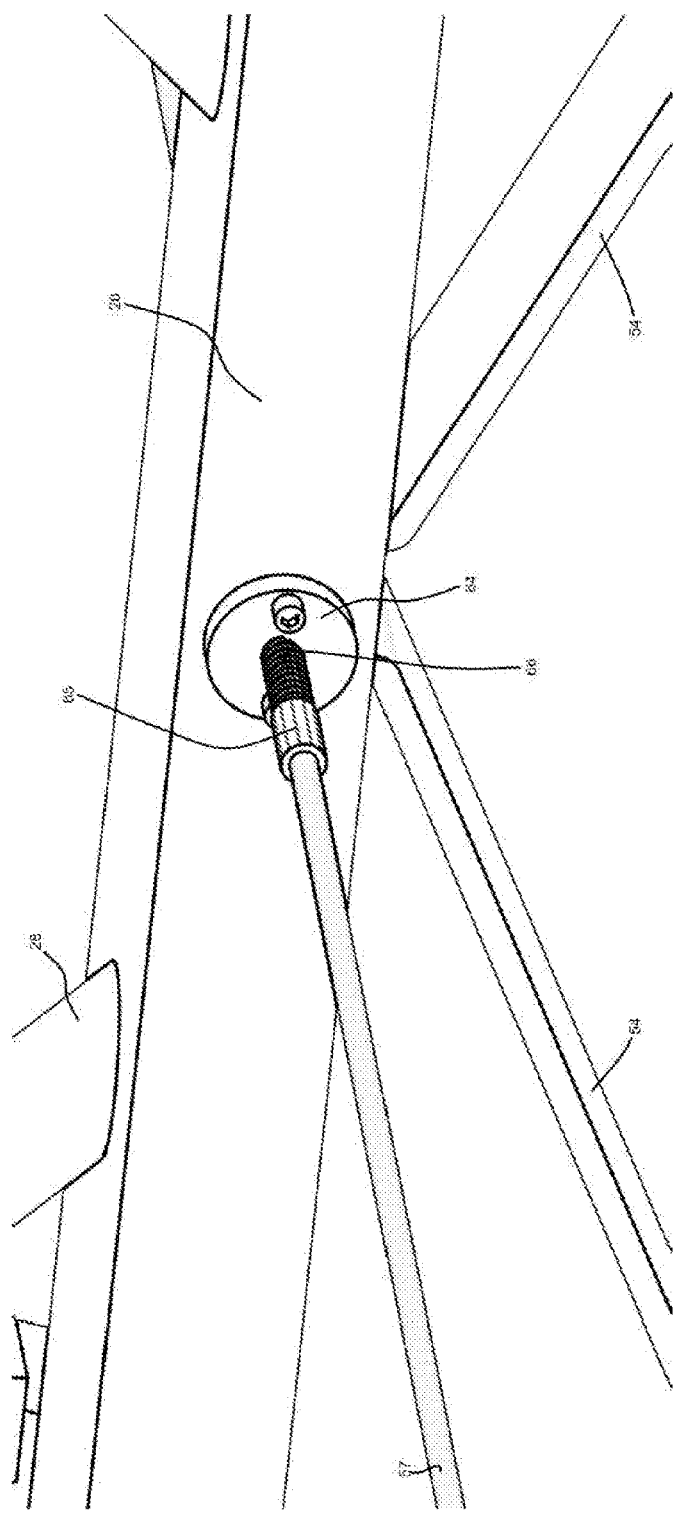
FIG. 21 is a detailed view of a portion of FIG. 20 showing the bush and stop on the wire rope.
Figure 22:
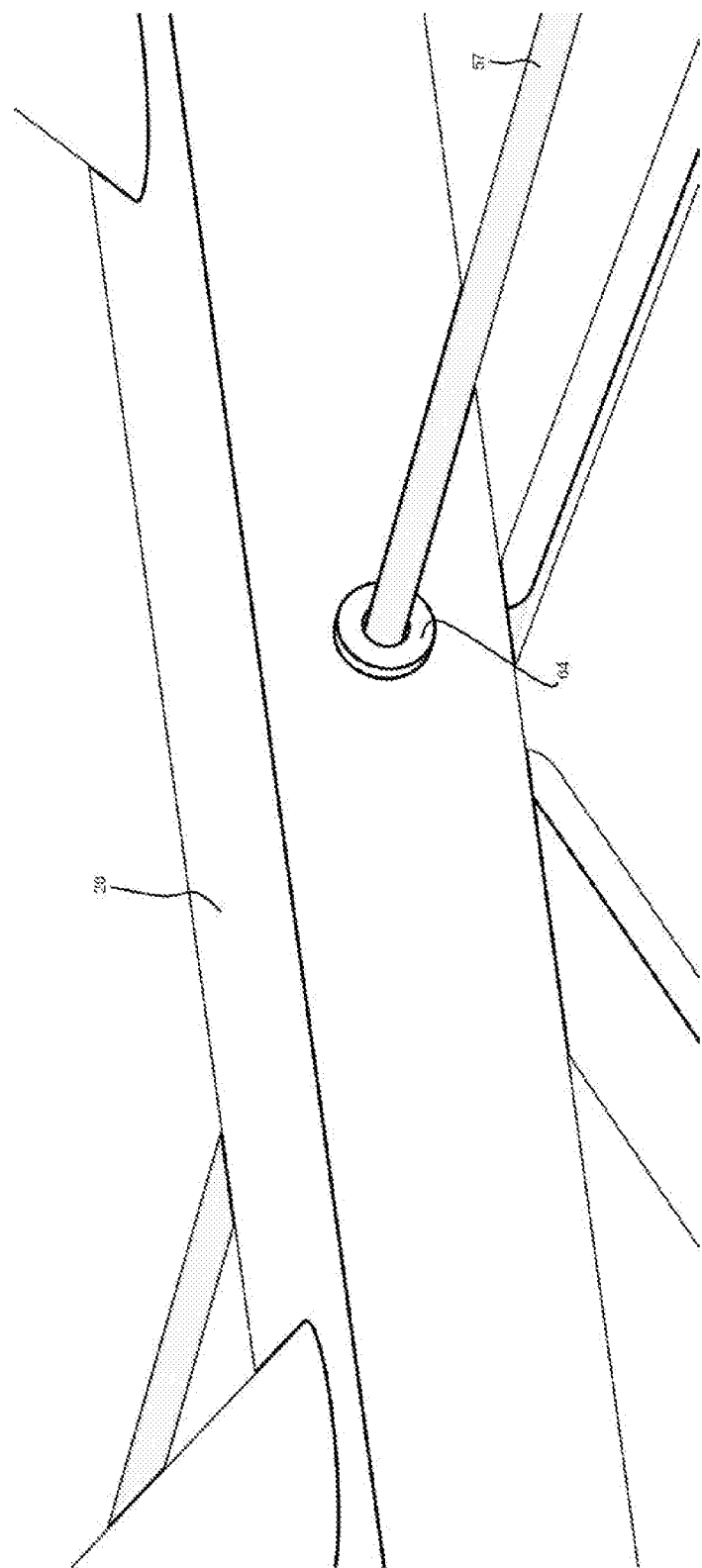
FIG. 22 is a detailed view of the opposite side of the carriage from FIG. 21.

Given the use of the vertical turnover wheel, tensioning of the carriages can be achieved by using the vertical wheel 7 to tension the wire rope 57 as will be described with reference to FIGS. 18 and 19.

The bearing blocks 59 rotatably supporting the vertical turnover wheel 7 can be mounted on a dolly 60 which is supported for horizontal movement by way of wheels 61 running on rails 62. Tensioning of the wire rope 57 can be achieved by a winch (not shown), hydraulic or pneumatic cylinders 63, or suspended weights (not shown). In this manner, the vertical wheel (typically at the head end only of the conveying system) can be moved horizontally in the manner of a horizontal take-up pulley to accommodate the permanent and elastic stretch of the wire rope 57. The incorporation of this tensioning mechanism in to the head end of the conveyor system can be clearly seen in FIG. 19.

In addition, the carriages 8 may be fixed to the wire rope by means of a mechanical fastener (not shown). Where a mechanical fastener is used, it is preferred that the mechanical fastener is a quick action fastener designed for quick release of the carriages from the rope for maintenance purposes. That is, the quick release enables a reduced time for conducting maintenance operations on the carriages 8 and/or wire rope 57.

In the rail conveyor design described above the wire rope 57 interconnecting the carriages may stretch less than the carry belt 43 (particularly when using a fabric belt) and the carriages therefore need to be able to move relative to the wire rope as the belt is stretched under increasing tension along the return side and the carry side. Design of the interaction between the wire rope and the carriages will now be described with reference to FIGS. 20 to 29.

Each carriage is provided with a bush, typically made from nylon or bronze with a hole through the bush slightly larger in diameter than the thickness of the wire rope 57. Adjacent each carriage the wire rope is provided with a stop 65 typically in the form of a metal crimp and the interaction between the stop 65 and the chassis rail 26 of the carriage is buffered by a small compression spring 66 wound around the wire rope 57.

When the carry belt is lifted off the carriages before being redirected around the vertical turnover wheel, the carriages will slow down, sliding back along the wire rope 57 and be re-engaged with the metal crimp 65 buffered by the compression spring 66.

Figure 23:
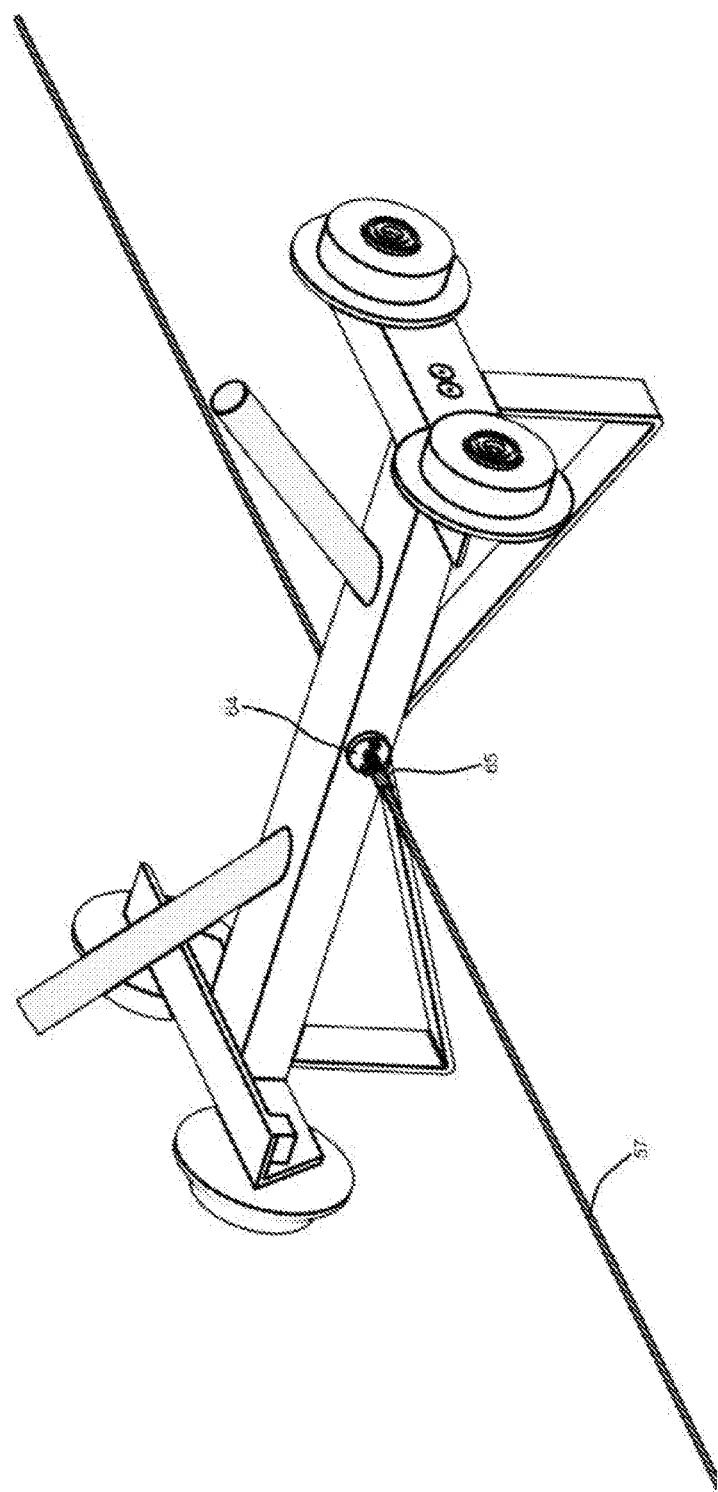
FIG. 23 shows the carriage relative to the wire rope in an initial position when first in contact with the belt.
Figure 24:
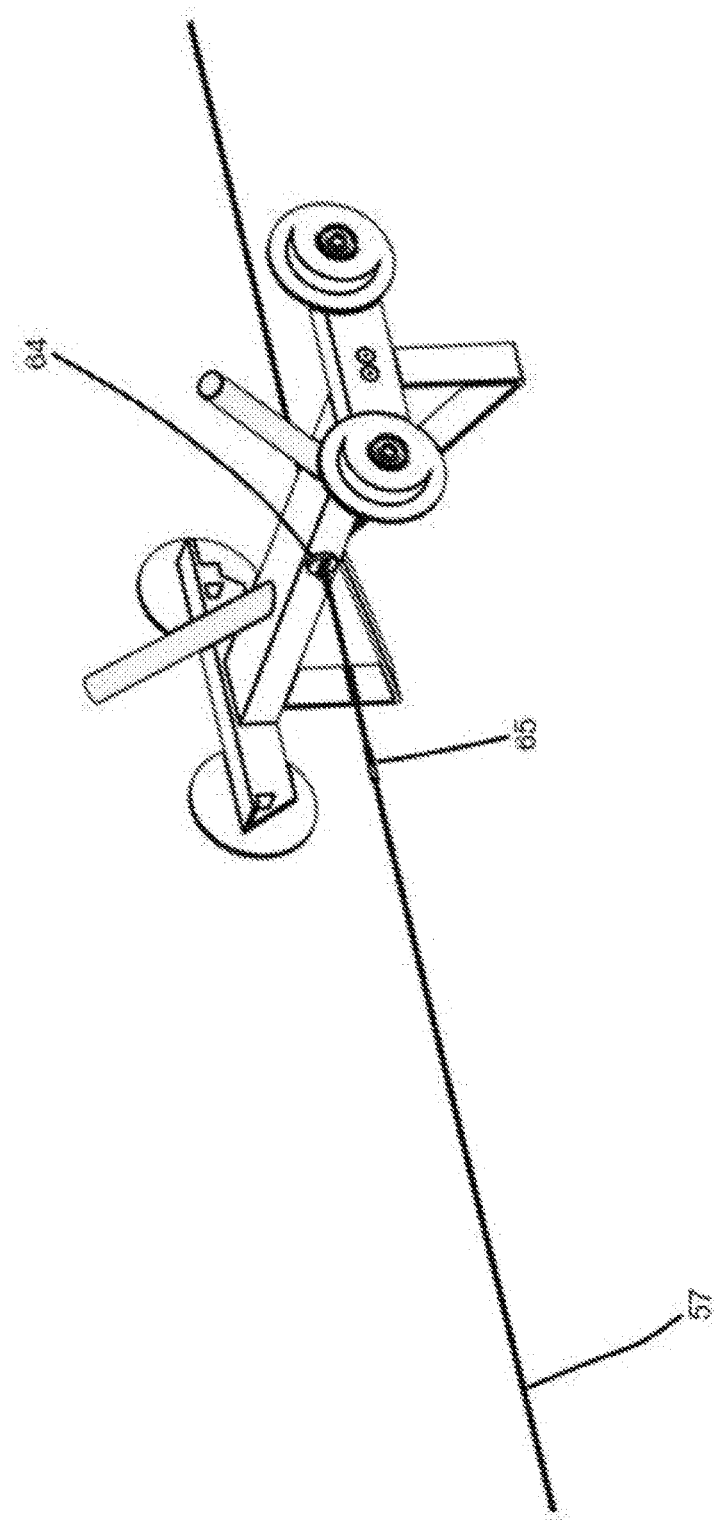
FIG. 24 shows the carriage relative to the wire rope after the belt has stretched.

FIG. 23 shows the carriage in the driving position with the stop 65 adjacent to the bush 64 and FIG. 24 shows the movement of the wire rope relative to the carriage as the belt stretches due to increasing tension along the carry and return side.

This system has significant advantage in minimising the necessary horizontal movement of the vertical wheel by the mechanism described above, and therefore reduces the cost of the system. Furthermore, where belt stretch is greater than the distance between carriages, the belt can be lifted off the carriages at regular intervals along the carry and return sides to allow the carriages to return back to their initial position along the wire rope as shown in FIG. 23.

Figure 25:
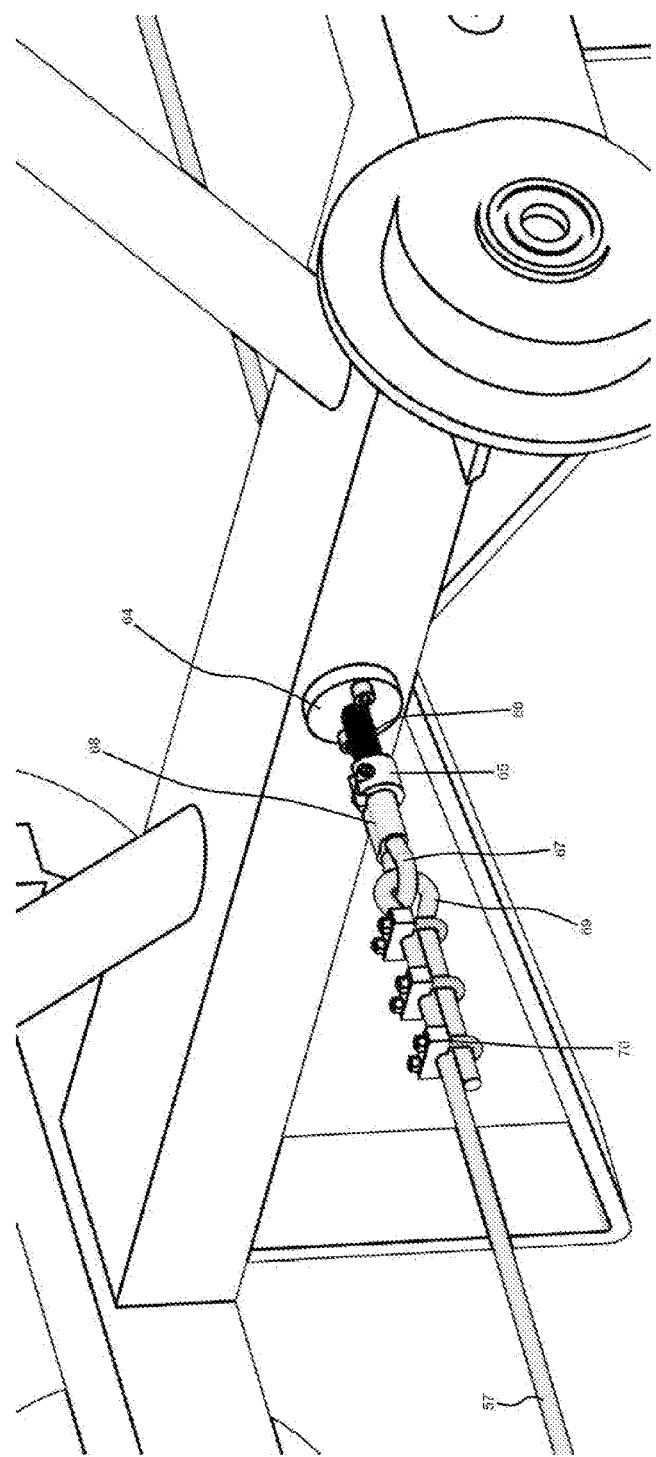
FIG. 25 shows a configuration with a removable spring stop and end loop joining methods.

To allow the carriages to be easily attached and removed from the wire rope the joining and attachment components can be made easily removable as shown in FIG. 25. The stop 65 is simply a removable clamping device capable of restraining each carriage and may be provided in the form of a commercially available removable wire rope clamp. The main requirement of the stop is a flat surface perpendicular to the wire rope forming a seat for the compression spring 66.

The method of joining the wire rope can also be provided by a number of commercially available solutions but might comprise an eye 67 crimped to one end of the wire rope at 68, through which is passed the looped end 69 of the wire rope 57 secured by a number of rope clamps 70.

Figure 26:
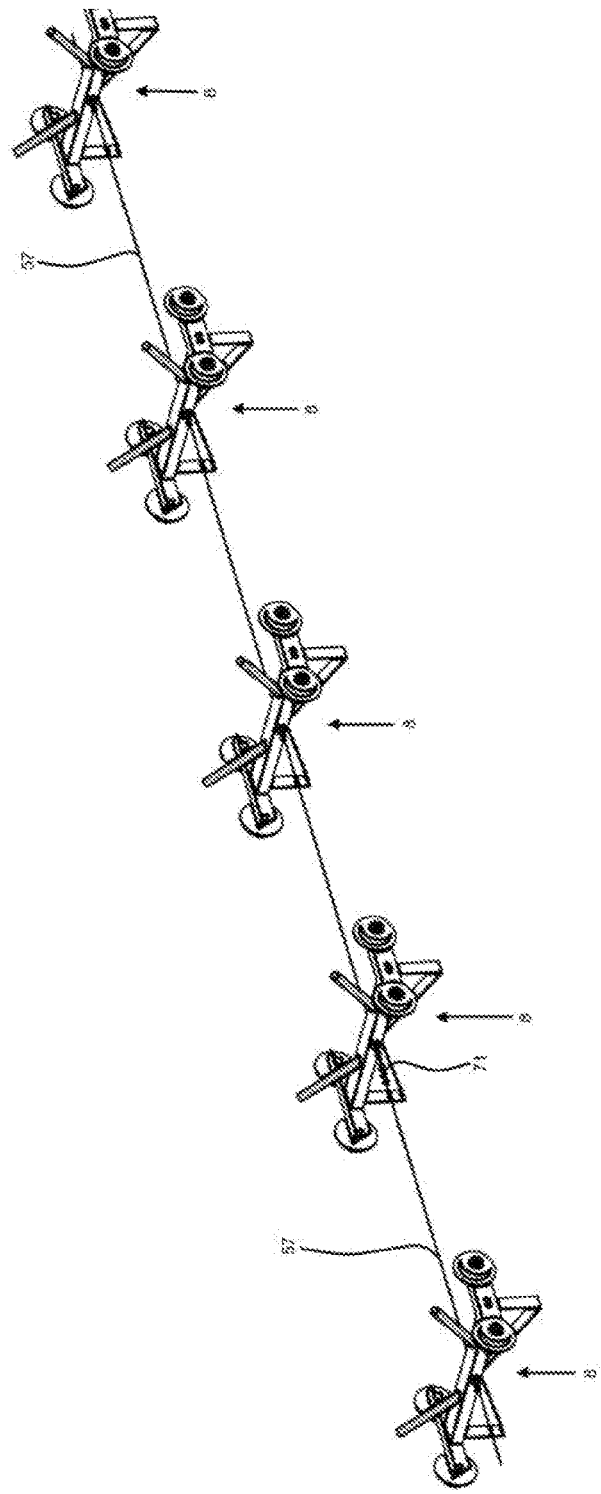
FIG. 26 shows the engagement of multiple carriages along the wire rope.

The length of the wire rope between joins will be a function of the distance between carriages but typically many carriages 8 would be connected to each length of wire rope 57 as shown in FIG. 26 where the removable wire rope joint shown in more detail in FIG. 25 is typically shown at 71.

Figure 27:
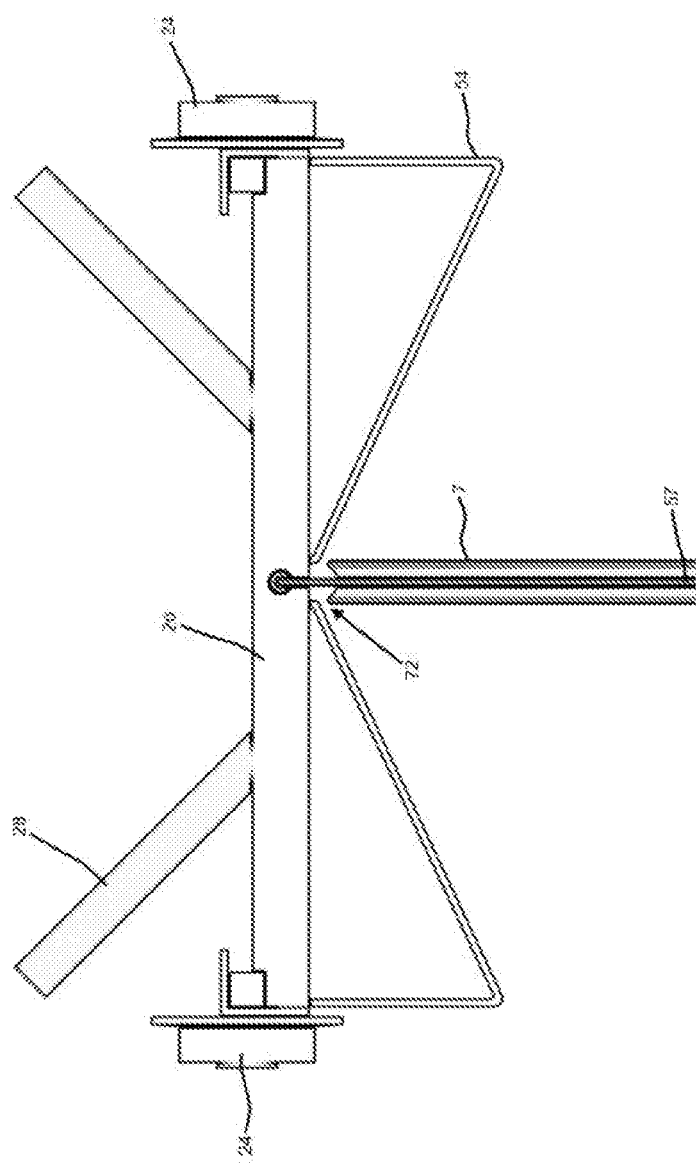
FIG. 27 is an elevation showing the clearance between each carriage and the vertical turnaround wheel.

A further consideration in terms of the clamping and joining methods available is the clearance between the carriage chassis member 26 and the inverted flat bar frame 54, and the vertical wheel 7 as shown in FIG. 27.

The nominal clearance 72 between the vertical wheel 7 and the lower side of the carriage chassis member 26 needs to be maintained at approximately 10 to 15 mm in order to allow correct functioning.

Figure 28:
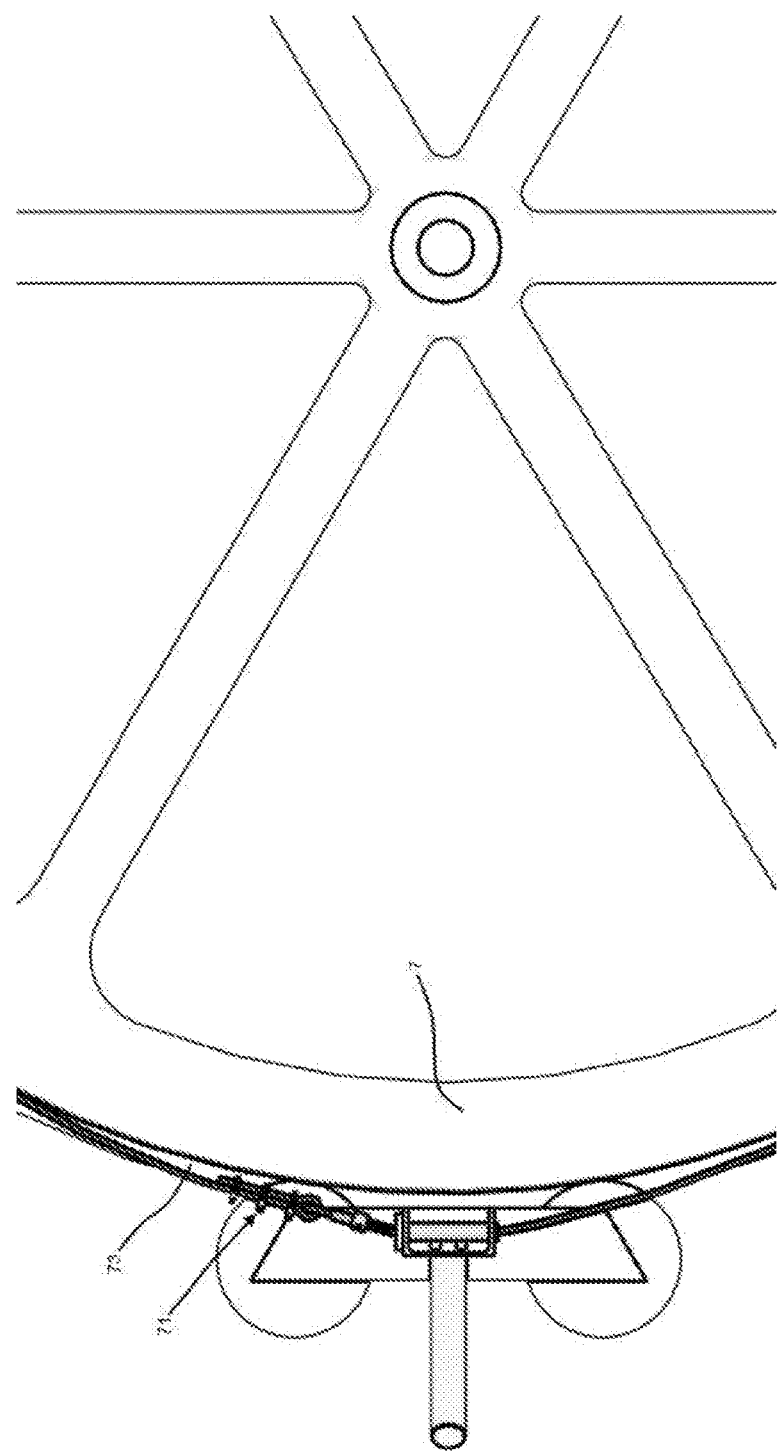
FIG. 28 is a vertical view orthogonal to FIG. 27.
Figure 29:
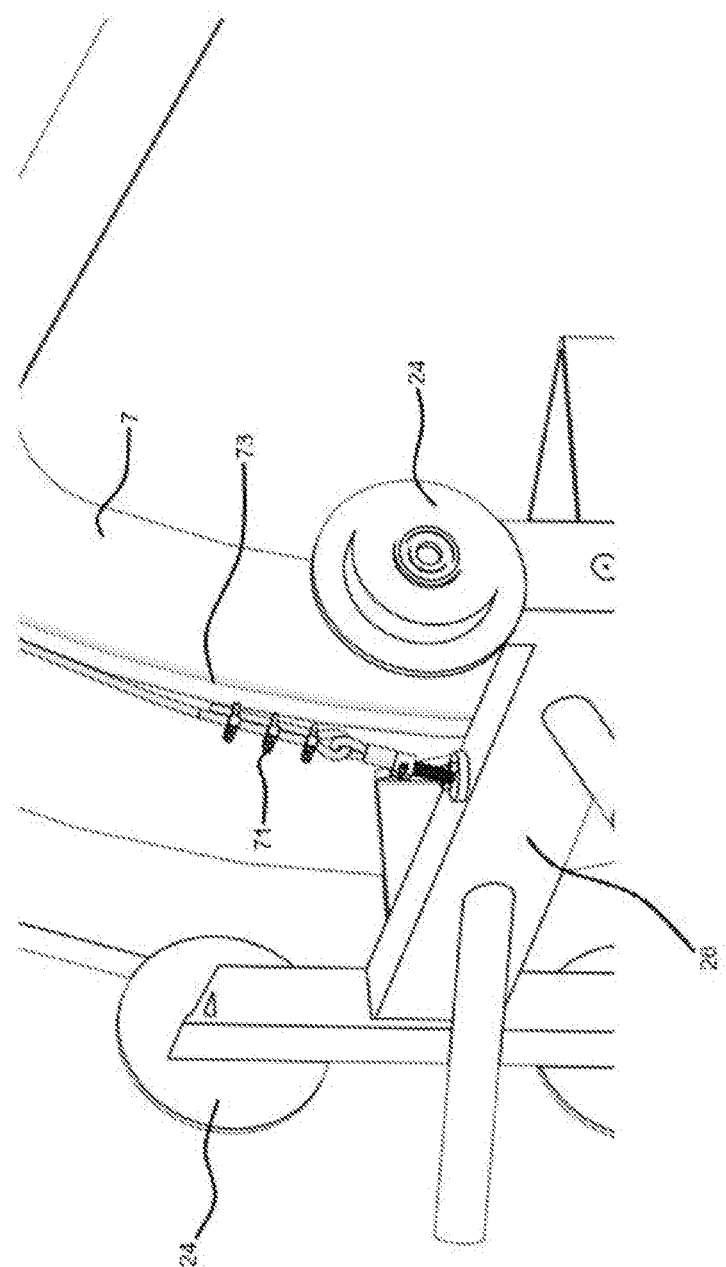
FIG. 29 is an enlarged perspective view of the wire rope attachment from FIG. 28.

This criticality is further shown in FIGS. 28 and 29 where clearance between the vertical wheel 7 and the wire rope clamp and joining components 71 can be seen at 73.

The required tension in the wire rope must also provide a restoring force toward the hub of the wheel to overcome the weight of the carriage and the centrifugal force as the carriage moves around the vertical turnover wheel 7.

It will be appreciated that while the embodiments have been described as using a wire rope, in other embodiments the wire rope may be replaced by a rope made of nylon, polyester or the like.

The invention claimed is:

1. A rail conveyor system of the type having a rail track comprising:
    a delivery run extending between a loading end and a discharge end and a return run extending from the discharge end to the loading end, a plurality of carriages spaced apart from one another and arranged to run on wheels supported by the track, and a continuous carry belt supported by the carriages;
    wherein the carriages are interconnected and spaced apart by a rope; and
    wherein, at least one of the discharge end or the loading end, the carriages are turned around to return to the other of the loading end or the discharge end, by being entrained around only a single vertical turnover wheel using the rope, the single vertical turnover wheel being arranged such that the carriages are delivered to the return run beneath the delivery run or to the delivery run above the return run, and
    the delivery run, the single turnover wheel, and the return run are located in the same vertical plane at said at least one of the discharge end or the loading end.

2. A rail conveyor system as claimed in claim 1 wherein the single vertical turnover wheel, with the delivery run, the turnover wheel, and the return run being located in the same vertical plane at the discharge end.

3. A rail conveyor system as claimed in claim 2 wherein, at the loading end, the carriages are turned around to return to the discharge end by being entrained around only one or more vertical turnover wheels using the rope, the one of more vertical turnover wheels being arranged such that the carriages are delivered to the delivery run above the return run.

4. A rail conveyor system as claimed in claim 3 wherein there is a single vertical turnover wheel, with the delivery run, the turnover wheel, and the return run being located in the same vertical plane at the loading end.

5. A rail conveyor system as claimed in claim 1 wherein the single vertical turnover wheel, with the delivery run, the turnover wheel, and the return run being located in the same vertical plane at the loading end.

6. A rail conveyor system as claimed in claim 1 wherein the carriages in the return run are rotated through 180° about an axis in, or parallel to, the return run, after leaving the turnover wheel, such that the carriages are returned in an upright orientation.

7. A rail conveyor system as claimed in claim 6 wherein the carriages are designed to accommodate flexing while being rotated.

8. A rail conveyor system as claimed in claim 7 wherein the flexibility is achieved by providing compressible blocks as mountings between supports for the wheels and supports for the carry belt.

9. A rail conveyor system as claimed in claim 7 wherein the flexibility is achieved by mounting the wheels on leaf springs attached to the carriage.

10. A rail conveyor system as claimed in claim 1 wherein the carriages are designed to travel the return run in an inverted position and are provided with means to support the carry belt in the inverted position.

11. A rail conveyor system as claimed in claim 10 wherein the means to support the carry belt in the inverted position include at least one of (a) pads protruding upwardly from the carriage when in the inverted position and (b) bars arranged to support the carry belt in a load carrying manner such that bulk material can be conveyed on both the delivery run and the return run.

12. A rail conveyor system as claimed in claim 1 wherein the rope is tensioned by horizontal movement of the turnover wheel.

13. A rail conveyor system as claimed in claim 12 wherein the rope passes through a hole in a bush in each carriage and the rope is provided with a stop, larger in width than the hole in the bush, adjacent each carriage such that each carriage can move relative to the rope, up to and away from the stop, to accommodate relative differences in stretch between the carry belt and the rope.

14. A rail conveyor system as claimed in claim 13 wherein a compression spring is provided for each carriage, wound around the rope and arranged to act as a buffer between the bush and the stop.

15. A rail conveyor system as claimed in claim 12 wherein the carriages are fixed to the rope by means of at least one of (a) a mechanical fastener and (b) a quick action fastener designed for quick release of the carriages from the rope.

16. A rail conveyor system as claimed in claim 12, wherein the rope is at least one of a wire rope, a nylon rope and a polyester rope.

17. A rail conveyor system as claimed in claim 1, wherein the continuous carry belt fully encloses the load.

18. A rail conveyor system as claimed in claim 17, wherein the continuous carry belt is wrapped around the load so that it overlaps.

19. A rail conveyor system as claimed in claim 1, wherein the continuous carry belt can be lifted off the carriages to allow the carriages to return back to their initial position along the wire rope.

20. A rail conveyor system as claimed in claim 19, wherein the continuous carry belt can be lifted off the carriages at regular intervals along the carry and return sides.

21. A rail conveyor system of the type having a rail track comprising:

a delivery run extending between a loading end and a discharge end and a return run extending from the discharge end to the loading end, a plurality of carriages spaced apart from one another and arranged to run on wheels supported by the track, and a continuous carry belt supported by the carriages;

wherein the carriages are interconnected and spaced apart by a rope;

wherein, at least at one of the discharge end or the loading end, the carriages are turned around to return to the other of the discharging end or the loading end, by being entrained around only one or more vertical turnover wheels using the rope, the one of more vertical turnover wheels being arranged such that the carriages are delivered to the return run beneath the delivery run or the delivery run above the return run; and wherein the continuous carry belt fully encloses the load.

22. A rail conveyor system as claimed in claim 21, wherein the continuous carry belt is wrapped around the load so that it overlaps.

* * * * *